United States Patent
Yamada et al.

(10) Patent No.: US 7,287,282 B2
(45) Date of Patent: Oct. 23, 2007

(54) COPYRIGHT PROTECTION SYSTEM, TRANSMITTER, RECEIVER, BRIDGE DEVICE, COPYRIGHT PROTECTIVE METHOD, MEDIUM, AND PROGRAM

(75) Inventors: Masazumi Yamada, Osaka (JP); Hiroyuki Iitsuka, Katano (JP); Naoshi Usuki, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 798 days.

(21) Appl. No.: 10/169,488

(22) PCT Filed: Sep. 17, 2001

(86) PCT No.: PCT/JP01/08034

§ 371 (c)(1),
(2), (4) Date: Oct. 3, 2002

(87) PCT Pub. No.: WO02/30054

PCT Pub. Date: Apr. 11, 2002

(65) Prior Publication Data

US 2003/0110378 A1    Jun. 12, 2003

(30) Foreign Application Priority Data

Sep. 29, 2000 (JP) .............................. 2000-298590

(51) Int. Cl.
*G06F 17/30* (2006.01)

(52) U.S. Cl. .............................. 726/26; 726/2; 726/11; 726/12; 713/153; 713/161; 713/165; 713/167; 713/189; 713/193; 380/201; 380/202; 380/203; 380/204; 705/51; 705/57

(58) Field of Classification Search ................ 713/193, 713/156, 161, 189, 153, 165, 167; 717/117; 726/2, 26, 11–12; 705/51, 78, 57; 380/201–204; 709/238, 244

See application file for complete search history.

(56) References Cited

U.S. PATENT DOCUMENTS

| 6,189,146 B1 * | 2/2001 | Misra et al. ................ 717/177 |
| 6,510,513 B1 * | 1/2003 | Danieli ....................... 713/156 |
| 6,529,886 B1 * | 3/2003 | Campana et al. ............. 705/78 |
| 6,782,476 B1 * | 8/2004 | Ishibashi .................... 713/169 |
| 6,834,349 B1 * | 12/2004 | Higurashi et al. .......... 713/193 |

FOREIGN PATENT DOCUMENTS

| EP | 0 715 245 A1 | 6/1996 |
| JP | 07-200492 | 8/1995 |
| JP | 2000-165376 | 6/2000 |
| WO | WO 00/42492 A2 | 7/2000 |

OTHER PUBLICATIONS

Japanese International Search Report for PCT/JP01/08034 dated Dec. 18, 2001.

(Continued)

*Primary Examiner*—Kim Vu
*Assistant Examiner*—Baotran N. To
(74) *Attorney, Agent, or Firm*—RatnerPrestia

(57) ABSTRACT

In the case that a bridge unit is connected to a network such as an IEEE 1394 bus, copyright holders want to limit the number of apparatuses that can receive a signal.

The invention provides at least one reception unit, or more, that is utilized for receiving data requiring copyright protection, connected to a network and by providing a transmission unit for transmitting data requiring copyright protection to a reception unit by utilizing a network, wherein the transmission unit has an authentication means on the transmission side for carrying out authentication for a reception unit and an authentication number counting means for counting the authentication number that is the number of the authentications carried out by the authentication means on the transmission side while the reception unit has an authentication means on the reception side for carrying out authentication for the authentication means on the transmission side and wherein the above authentication number is limited.

43 Claims, 13 Drawing Sheets

OTHER PUBLICATIONS

English translation of Japanese International Search Report for PCT/JP01/08034 dated Dec. 18, 2001.

Supplementary European Search Report for EP 01 96 7691, dated Aug. 1, 2005.

"5C Digital Transmission Content Protection White Paper", Internet White Paper, Jul. 14, 1998, pp. 1-13.

"MPEG-4 Intellectual Property Management & Protection (IPMP) Overview & Applications", International Organisation For Standardization Organisation Internationale Normalisation, Dec. 1998, pp. 1-8.

* cited by examiner

Fig. 4

| apparatus that has carried out authentication request | type of authentication | authentication result | counted authentication number | stored device ID |
|---|---|---|---|---|
| nothing | — | — | 0 | nothing |
| sink1 (5) | authentication | successful | 1 | sink1 (5) |
| sink0 (4) | authentication | successful | 2 | sink1 (5), sink0 (4) |
| sink3 (7) | authentication | successful | 3 | sink1 (5), sink0 (4), sink3 (7) |
| sink4 (8) | authentication | rejected | 3 | sink1 (5), sink0 (4), sink3 (7) |
| sink0 (4) | authentication | successful | 3 | sink1 (5), sink0 (4), sink3 (7) |
| sink1 (5) | decrement authentication | successful | 2 | sink0 (4), sink3 (7) |
| sink4 (8) | authentication | successful | 3 | sink0 (4), sink3 (7), sink4 (8) |

Fig. 6

| apparatus that has carried out authentication request | type of authentication | authentication result | counted authentication number | stored device ID |
|---|---|---|---|---|
| sink1 (5) | authentication | successful | 0 | nothing |
| sink0 (4) | authentication | successful | 1 | sink1 (5) |
| sink3 (7) | authentication | successful | 2 | sink1 (5), sink0 (4) |
| sink4 (8) | authentication | rejected | 3 | sink1 (5), sink0 (4), sink3 (7) |
| sink1 (5) | decrement authentication | successful | 3 | sink1 (5), sink0 (4), sink3 (7) |
| sink4 (8) | authentication | successful | 2 | sink0 (4), sink3 (7) |
| | | | 3 | sink0 (4), sink3 (7), sink4 (8) |

COPYRIGHT PROTECTION SYSTEM, TRANSMITTER, RECEIVER, BRIDGE DEVICE, COPYRIGHT PROTECTIVE METHOD, MEDIUM, AND PROGRAM

This application is a U.S. National Phase Application of PCT International Application PCT/JP01/08034.

TECHNICAL FIELD

The present invention relates to a copyright protection system, a transmission unit, a reception unit, a bridge unit, a copyright protection method, a medium and a program wherein data requiring copyright protection is transmitted or received while the copyright of the data is protected.

BACKGROUND TECHNOLOGY

In recent years network technology for making connections between audio visual systems has come into common use. As one of such networks, a serial bus (hereinafter referred to as IEEE 1394 bus) of the IEEE 1394-1995 standard (hereinafter referred to as IEEE 1394) exists. IEEE 1394 is a standard of high speed bus system for carrying out a serial transmission, wherein data can be synchronously transmitted so that a real time transmission of audio visual data, or the like, is possible. This IEEE 1394 has begun to be installed in a variety of digital video and sound apparatuses, such as digital audio visual apparatuses for home use, as an external interface.

On the other hand, in the case that data requiring copyright protection such as newly released movies or TV programs, music of paid broadcasts is handled, it is necessary to protect the copyright. As an effective method for protecting copyright, there is a method of the encrypting of data requiring copyright protection so as to limit the utilization of the data.

For example, when video and sound data (hereinafter referred to as AV data) is transmitted utilizing an IEEE 1394 bus, such AV data is encrypted at the time of transmission in the case that copyright protection of the AV data is required. As an example of this, the DTCP (digital transmission content protection) system has become a standard.

The DTCP system is provided with an authentication function and a key nullification function so that copyright protection is implemented by encrypting and transmitting data requiring copyright protection, such as AV data, while excluding unauthorized apparatuses at the time of data transmission over an IEEE 1394.

A transmitter for transmitting content data encrypts content data with a content key. This content key is periodically updated by the transmitter. The transmitter encrypts the content key with a key called an exchange key and transmits the content key to a receiver in order to safely pass the updated content key to the receiver.

The authentication function is required for passing the key for decrypting the encrypted data to only the receiver that has received a DTCP license and a full authentication utilizing public key encryption technology and a limited authentication utilizing common key encryption are used in accordance with copy limitation information (such as "copy once" or "copy never") added to the data and in accordance with the characteristics of the apparatuses (such as inclusion of a recording function, inclusion of a display function only, whether or not format analysis and decoding are possible within data). An apparatus compatible with the full authentication system has certificate data including a signature added by a licensing organization. At the time of authentication, the certificate data is transmitted and received so that the signature is determined to be correct by utilizing an algorithm of an electronic signature using public key encryption technology. Random numbers are transmitted to each other together with the certificate data and, thereby, an authentication key that is effective only between the two apparatuses wherein authentication is carried out can be produced within the respective apparatuses by using the random numbers from both sides.

An apparatus compatible with the limited authentication system has common secret information and a processing function. At the time of authentication, challenging random numbers are transmitted. The apparatus that has received the random numbers carries out processing according to a predetermined function and sends back the result. The apparatus, which has transmitted the challenging random numbers, compares the response and the value that is processed within the apparatus and, thereby, confirms that the other apparatus is the authorized apparatus. An authentication key that is effective only between the two apparatuses that carry out the authentication can be produced within the respective apparatuses by using random numbers from both sides.

When the authorized apparatus can be confirmed through the above described authentication process, the transmitter encrypts the exchange key with the authentication key and transmits the exchange key to the receiver. Thereby, a content key can be gained at the receiver side so that the received encrypted contents can be decrypted and utilized.

In the following, the IEEE 1394 bus system is described in reference to FIG. 12.

In FIG. 12, IEEE 1394 bus #1 (50) and IEEE 1394 bus #2 (51) are, respectively, different IEEE 1394 buses and are connected to each other by a bridge unit 52.

Devices such as device #0 (53) and device #1 (54) are connected to IEEE 1394 bus #1 (50).

Devices such as device #0 (58) and device #1 (59) are connected to IEEE 1394 bus #2 (51).

Device #0 (53), device #1 (54), device #0 (58), device #1 (59), and the like, are apparatuses for transmitting or receiving data by utilizing IEEE 1394 bus #1 (50) or IEEE 1394 bus #2 (51) and are, for example, an STB (set top box) or a TV (television).

In addition, bridge unit 52 is a unit that receives data, which is transmitted from device #2 (55), or the like, connected to IEEE 1394 bus #1 (50), and transmits the data to IEEE 1394 bus #2 (51).

In the IEEE 1394 standard there is a limitation wherein a maximum of sixty-three devices can be simultaneously connected to one bus. Accordingly, a maximum of sixty-three devices can be simultaneously connected to IEEE 1394 bus #1 (50) and, in addition, a maximum of sixty-three devices can be simultaneously connected to IEEE 1394 bus #2 (51).

For example, in the example of FIG. 12, seven devices, including bridge unit 52, are connected to IEEE 1394 bus #1 (50) and, therefore, fifty-six additional devices can be connected.

Device 53 transmits data at a transmission rate of 20 Mbps through a synchronous transmission called an isochronous transmission to channel 1 of IEEE 1394 bus #1 (50). Then, device #1 (54) receives the data that is transferred to channel 1 of IEEE 1394 bus #1 (50).

In addition, device #4 (56) transmits data at a transmission rate of 40 Mbps to channel 63 of IEEE 1394 bus #1 (50). Then, device #5 (57) receives the data transmitted over channel 63.

Device #0 (58) transmits data at a transmission rate of 30 Mbps to channel 2 of IEEE 1394 bus #2 (51) in the same manner and device #1 (59) receives the data transmitted to channel 2. In addition, device #3 (61) transmits data at 30 Mbps to channel 1 and device #4 (62) and device #5 (63) simultaneously receive data transmitted to channel 1.

On the other hand, device #2 (55) transmits data at a transmission rate of 20 Mbps to channel 0 of IEEE 1394 bus #1 (50). Bridge unit 52 receives data transmitted to channel 0 of IEEE 1394 bus #1 (50), which is transmitted to channel 0 of IEEE 1394 bus #2 (51). Then, device #2 (60) receives data that is transmitted to channel 0 of IEEE 1394 bus #2 (51).

Thus, it is possible to transmit data in real time by utilizing an isochronous transmission and the data transmitted by a device can be received in real time by a device connected to a different bus through a bridge unit when the two different IEEE 1394 buses are connected via bridge unit 52.

Furthermore, copyright holders have a desire for the number of reception apparatuses that can receive a signal from the apparatus that becomes a signal source to be limited at the time when video and sound data (AV data) requiring copyright protection, or the like, is transmitted.

As described above, there is a limitation wherein a maximum of only sixty-three apparatuses can be simultaneously connected to one IEEE 1394 bus. Accordingly, the number of reception units that can simultaneously receive data transmitted from the apparatus that becomes a signal source is sixty-two at the maximum.

When different IEEE 1394 buses are connected via a bridge unit as described above, however, it becomes impossible to grasp how many reception apparatuses receive the signal, from the apparatus that becomes a signal source, through the other bus connected to the apparatus that becomes a signal source via bridge unit 52. For example, a case can occur wherein an additional bridge unit is connected to the other bus connected to the apparatus that becomes a signal source via bridge unit 52. When bridge unit 52 is connected to an IEEE 1394 bus in such a manner, there is a risk that a very large number of reception apparatuses may receive the signal transmitted from the apparatus that becomes a signal source. In addition, the same may be said concerning the case of a network, such as USB, in addition to the IEEE 1394 bus.

That is to say, in the case that a bridge unit is connected to a network, such as the IEEE 1394 bus, there is a risk that a very large number of reception apparatuses may receive a signal requiring copyright protection sent from the apparatus that becomes a signal source so that there is a problem (first problem) wherein the desire of copyright holders to limit the number of apparatuses that can receive the signal cannot be met.

In addition, in the case that a bridge unit is not connected to an IEEE 1394 bus, the desire of copyright holders cannot be met when six, or more, reception apparatuses are simultaneously connected to the IEEE 1394 bus even in the case wherein the copyright holders desire that only up to five reception apparatuses be able to receive the signal. In addition, this is not limited to the IEEE 1394 bus but, rather, the same can be said concerning a network such as USB.

That is to say, even in the case that copyright holders desire to designate and limit the number of reception apparatuses that can receive the signal, there is a problem (second problem) wherein the desire cannot be met.

DISCLOSURE OF THE INVENTION

The present invention is provided by taking the above described first problem into consideration and a purpose thereof is to provide a copyright protection system, a transmission unit, a reception unit, a bridge unit, a copyright protection method, a medium and a program wherein the desire of copyright holders to limit the number of reception apparatuses that can receive the signal requiring copyright protection can be met even in the case that a bridge unit is connected to the network.

In addition, the present invention is provided taking the above described second problem into consideration and a purpose thereof is to provide a copyright protection system, a transmission unit, a reception unit, a bridge unit, a copyright protection method, a medium and a program wherein the desire of copyright holders to limit the number of reception apparatuses that can receive the signal requiring copyright protection by designating the number of reception apparatuses can be met.

To solve the above problems, one aspect of the present invention is a copyright protection system, comprising:

at least one, or more, reception unit that is connected to a network and that receives and utilizes data requiring copyright protection; and a transmission unit of transmitting said data requiring copyright protection to said reception unit by utilizing said network, wherein said transmission unit has: an authentication means on the transmission side, of carrying out authentication for said reception unit; and an authentication number counting means of counting the authentication number, that is the number authenticated by said authentication means on the transmission side, and said reception unit has an authentication means on the reception side, of carrying out authentication for said authentication means on the transmission side, and wherein said authentication number is limited.

Another aspect of the present invention is the copyright protection system, wherein said authentication number counting means adds said authentication number in the case that said authentication means on the transmission side successfully carries out authentication.

Still another aspect of the present invention is the copyright protection system, wherein in the case that authentication is successfully carried out for said transmission unit, said reception unit does not, again, carry out an authentication request as long as said successful authentication is not reset due to a predetermined cause.

Yet still another aspect of the present invention is the copyright protection system, further comprising a bridge unit of connecting said network to another network, wherein the bridge unit is handled in the same manner as said reception unit in said network to which said transmission unit is connected, and wherein said bridge unit can, again, carry out an authentication request.

Still yet another aspect of the present invention is the copyright protection system, herein in the case that authentication is successfully carried out for said reception unit, said transmission unit does not accept an authentication request even if the authentication request is carried out, again, by said reception unit as long as said successful authentication is not reset due to a predetermined cause.

A further aspect of the present invention is the copyright protection system, further comprising a bridge unit of connecting said network to another network, wherein the bridge unit is handled in the same manner as said reception unit in said network to which said transmission unit is connected, and wherein in the case that an authentication request is carried out by said bridge unit said transmission unit accepts the authentication request.

A still further aspect of the present invention is the copyright protection system, wherein in the case that authentication is successfully carried out on said reception unit, said transmission unit carries out authentication, again, for said reception unit and said authentication number counting means does not add said authentication number even if the authentication is successful, as long as said authentication is not reset due to a predetermined cause.

A yet further aspect of the present invention is the copyright protection system, further comprising a bridge unit of connecting said network to another network, wherein the bridge unit is handled in the same manner as said reception unit in said network to which said transmission unit is connected, and wherein in the case that authentication is successfully carried out again for said bridge unit said authentication number counting means adds said authentication number.

A still yet further aspect of the present invention is the copyright protection system, wherein said authentication means on the transmission side has:

a registration means of registering information that specifies said reception unit for which authentication is successfully carried out; and a redundancy determination means of determining whether or not an authentication request is the authentication request from said reception unit that has already successfully carried out authentication, when the authentication request is carried out by said reception unit, by utilizing the registered information that specifies said reception unit.

An additional aspect of the present invention is the copyright protection system, wherein the reset of said authentication occurs at the time when an update of a key is carried out.

A still additional aspect of the present invention is the copyright protection system, wherein the reset of said authentication occurs at the time when an update of an exchange key is carried out.

A yet additional aspect of the present invention is the copyright protection system, comprising a bridge unit for connecting said network to another network, wherein the bridge unit is handled in the same manner as said reception unit in said network to which said transmission unit is connected, and wherein in the case that said transmission unit carries out said update of a key the reset of said authentication is carried out also in said other network.

A still yet additional aspect of the present invention is the copyright protection system, wherein the reset of said authentication occurs at the time when a bus reset is carried out.

A supplementary aspect of the present invention is the copyright protection system, comprising a bridge unit of connecting said network to another network, wherein the bridge unit is handled in the same manner as said reception unit in said network to which said transmission unit is connected, and wherein in the case that said bus reset is carried out in said network to which said transmission unit is connected, the reset of said authentication is carried out also in said other network.

A still supplementary aspect of the resent invention is the copyright protection system, wherein the limitation in said authentication number indicates that said authentication means on the transmission side does not accept an authentication request from said reception unit in the case that said authentication number becomes a predetermined value, or greater.

A yet supplementary aspect of the present invention is the copyright protection system, wherein said authentication number counting means subtracts said authentication number in the case that said reception unit that has successfully carried out authentication for said authentication means on the transmission side stops the utilization of said data requiring copyright protection that is sent from said transmission unit.

A still yet supplementary aspect of the present invention is the copyright protection system, comprising a bridge unit of connecting said network to another network, wherein the bridge unit is handled in the same manner as said reception unit in said network to which said transmission unit is connected, and wherein "said bridge unit stops the utilization of said data requiring copyright protection that is sent from said transmission unit" indicates that all of said reception units connected to said other network stop the utilization of said data requiring copyright protection that is sent from said transmission unit.

Another aspect of the present invention is the copyright protection system, wherein said transmission unit has a registration means of registering information that specifies said reception unit that has successfully carried out authentication for said authentication means on the transmission side, and said registration means cancels the registration of the information that specifies the reception unit that has successfully carried out authentication for said authentication means on the transmission side, in the case that said authentication number counting means subtracts said authentication number.

Still another aspect of the present invention is the copyright protection system, wherein said transmission unit has an examination means of examining whether or not said reception unit has stopped the utilization of said data requiring copyright protection.

Yet still another aspect of the present invention is the copyright protection system, wherein the stoppage of the utilization of said data requiring copyright protection indicates that said reception unit is detached from said network, and said examination means periodically examines whether or not said reception unit is detached from said network.

Still yet another aspect of the present invention is the copyright protection system, wherein said examination indicates the periodically examining of the connection number that is the number of said reception units connected to said network and the checking of which of said reception units is detached from said network in the case that said connection number is reduced.

A further aspect of the present invention is the copyright protection system, wherein said examination means checks if said reception unit has stopped the utilization of said data requiring copyright protection by examining an operational condition of said reception unit and/or an active condition of the connection plugs, and said authentication number counting means subtracts said authentication number in the case that, as a result of the examination by said examination means, said reception unit is determined not to utilize said data requiring copyright protection.

A still further aspect of the present invention is the copyright protection system, wherein said examination means has a correspondence table of allowing information that specifies said reception unit to correspond to the signature of that reception unit said examination means determines whether or not authentication has been carried out on said reception unit that is detached from said network by utilizing said correspondence table, and said authentication number counting means subtracts said authentication number in the case that said determination result shows that authentication has been carried out for said reception unit that is detached from said network.

A yet further aspect of the present invention is the copyright protection system, wherein said authentication means on the reception side carries out a decrement authentication request of subtracting said authentication number for said transmission unit in the case that said reception unit stops the utilization of said data requiring copyright protection that is sent from said transmission unit, said authentication means on the transmission side carries out said decrement authentication for said authentication means on the reception side, and said authentication number counting means subtracts said authentication number when said decrement authentication is successful.

A still yet further aspect of the present invention is the copyright protection system, wherein a command for decrement authentication, that is a command for carrying out said decrement authentication, is prepared separately from the authentication command that is the command for carrying out authentication at the time when said data requiring copyright protection is utilized.

An additional aspect of the present invention is the copyright protection system, wherein said data requiring copyright protection is encrypted and said reception unit abandons the key for decoding said data requiring copyright protection when said decrement authentication is successful.

A still additional aspect of the present invention is the copyright protection system, wherein said decrement authentication differs from the authentication for utilizing said data requiring copyright protection in at least one, or more, of a signature, an authentication method and an operational equation.

A yet additional aspect of the present invention is the copyright protection system, wherein when the authentication is reset due to the predetermined cause, said authentication number counting means initializes said authentication number while said registration means cancels all the registrations of information that specifies the reception unit which has successfully carried out authentication for said authentication means on the transmission side.

A still yet additional aspect of the present invention is the copyright protection system, further comprising a bridge unit of connecting said network to another network.

A supplementary aspect of the present invention is the copyright protection system, wherein said bridge unit is handled in the same manner as said transmission unit in said other network, and in the case that an authentication request is carried out by said reception unit connected to said other network, authentication is carried out for said transmission unit connected to said network before authentication is carried out for the reception unit and in the case that the authentication for the transmission unit is successful authentication is carried out for said reception unit.

One aspect of the present invention is the copyright protection system, wherein, in the case that said authentication number counting means of said bridge unit is subtracted, said bridge unit carries out decrement authentication for said transmission unit connected to said network, in order to subtract said authentication number counted by said authentication number counting means of said transmission unit that is connected to said network.

Another aspect of the present invention is the copyright protection system, wherein said authentication number counting means of said bridge unit counts the authentication number that is the number of the successful authentications carried out for said reception unit, which is connected to said other network, by said authentication means on the transmission side of said bridge unit.

Still another aspect of the present invention is the copyright protection system, wherein, in the case that said transmission unit is newly connected to said network, said bridge unit carries out authentication for said newly connected transmission unit in accordance with said authentication number that is counted by said authentication number counting means of said bridge unit.

Yet still another aspect of the present invention is the copyright protection system, wherein said bridge unit has a key counting means of counting a limitation number of a permissions allocated by said transmission unit that is connected to said network, said authentication number counting means of said bridge unit counts said authentication number that is the number of successful authentication carried out for said reception unit, which is connected to said other network, by said authentication means on the transmission side of said bridge unit, said bridge unit sets the number of successful authentications carried out for said transmission unit, which is connected to said network, as the limitation number of said permissions counted by said key counting means, in the case that a decrement authentication request is carried out, in order to subtract said authentication number counted by said authentication number counting means of said bridge unit, by said reception unit that is connected to said other network, said bridge unit does not carry out decrement authentication for said transmission unit that is connected to said network but, rather, carries out decrement authentication for the reception unit, said authentication number counting means of said bridge unit subtracts said authentication number when said decrement authentication is successful, and at the time when an authentication request is newly carried out by said reception unit connected to said other network, authentication is carried out for the reception unit in the case that the limitation number of said permissions is smaller than said authentication number that is counted by said authentication number counting means of said bridge unit while authentication is carried out for said transmission unit connected to said network before authentication is carried out for the reception unit in the case that the limitation number of said permissions is not smaller than said authentication number counted by said authentication number counting means of said bridge unit and, then, authentication is carried out for the reception unit in the case that the authentication for said transmission unit is successful.

Still yet another aspect of the present invention is the copyright protection system, wherein said bridge unit reencrypts data that is sent from said transmission unit connected to said network and transmits the data to said reception unit connected to said other network, said authentication number counting means of said bridge unit counts the authentication number that is the number of successful authentications carried out for said reception unit, which is connected to said other network, by said authentication means on the transmission side of said bridge unit, and said bridge unit has a key counting means of counting the limitation number of permissions allocated by said transmission unit connected to said network.

A further aspect of the present invention is the copyright protection system, wherein in the case that an authentication request is carried out by said reception unit that is connected to said other network, in the case that said authentication number counted by said authentication number counting means of said bridge unit and the limitation number of said permissions counted by said key counting means are greater than said authentication number counted by said authentication number counting means of said bridge unit, said bridge unit permits the authentication request.

A still further aspect of the present invention is the copyright protection system, wherein the upper limit of the limitation number of permissions counted by said key counting means is in advance given by said transmission unit that is connected to said network.

A yet further aspect of the present invention is the copyright protection system, wherein said bridge unit carries out authentication for said transmission unit, which is connected to said network and, thereby, the upper limit of the limitation number of permissions counted by said key counting means is added.

A still yet further aspect of the present invention is the copyright protection system, wherein, in the case that an authentication request is carried out by said reception unit connected to said other network, in the case that the limitation number of said permissions counted by said key counting means is not greater than said authentication number counted by said authentication number counting means of said bridge unit, said bridge unit rejects the authentication request.

An additional aspect of the present invention is the copyright protection system, wherein, in the case that an authentication request is carried out by said reception unit connected to said other network, in the case that the limitation number of said permissions counted by said key counting means is not greater than said authentication number counted by said authentication number counting means of said bridge unit, said bridge unit calls on said transmission unit connected to said network to add the limitation number of said permissions.

A still additional aspect of the present invention is the copyright protection system, wherein, in the case that an authentication request is carried out by said reception unit connected to said other network, in the case that the limitation number of said permissions counted by said key counting means is not greater than said authentication number counted by said authentication number counting means of said bridge unit, said bridge unit carries out an authentication request for said transmission unit connected to said network and said key counting means adds the limitation number of said permissions in the case that said authentication is successful.

A yet additional aspect of the present invention is the copyright protection system, wherein said bridge unit makes a notification of the number of said reception units that is connected to said other network and that carries out an authentication request for said transmission unit connected to said network whenever an authentication request is carried out by said reception unit connected to said other network.

A still yet additional aspect of the present invention is the copyright protection system, wherein a field for making a notification of said number is provided in an authentication command of said bridge unit to carry out an authentication request for said transmission unit that is connected to said network so that said bridge unit makes a notification of said number by utilizing said field.

A supplementary aspect of the present invention is the copyright protection system, wherein an authentication command of said bridge unit to carry out an authentication request for said transmission unit that is connected to said network is distinguished from an authentication command of said reception unit that does not have a function of said bridge unit and that is connected to said network to carry out an authentication request for said transmission unit connected to said network.

A still supplementary aspect of the present invention is the copyright protection system, wherein said distinguishment is carried out by means of the signature attached to said authentication command.

A yet supplementary aspect of the present invention is a transmission unit for transmitting data requiring copyright protection, by utilizing a network, to at least one, or more, reception unit which has an authentication means on the reception side for carrying out authentication for a transmission unit, is connected to said network and receives and utilizes said data requiring copyright protection, wherein the transmission unit comprises characterized in having:

an authentication means on the transmission side for carrying out authentication for said authentication means on the reception side; and an authentication number counting means of counting authentication number that is the number of authentications carried out by said authentication means on the transmission side, wherein said authentication number is limited.

A still yet supplementary aspect of the present invention is a reception unit that is connected to a network and that is utilized for receiving data requiring copyright protection, wherein the reception unit comprises:

an authentication means on the reception side of carrying out authentication for an authentication means on the transmission side which is provided in a transmission unit having said authentication means on the transmission side of carrying our authentication for the reception unit and an authentication number counting means of counting authentication number that is the number of the authentications carried out by said authentication means on the transmission side, wherein said authentication number is limited.

Another aspect of the present invention is a bridge unit for transmitting data requiring copyright protection that is transmitted from a transmission unit connected to one network to a reception unit connected to the other network, wherein the bridge unit comprises:

an authentication means on the transmission side for bridge unit that carries out authentication for said reception unit;

an authentication number counting means of bridge unit that counts the authentication number for bridge unit that is the number of the authentications carried out by said authentication means on the transmission side; and an authentication means on the reception side for bridge unit that carries out authentication for said transmission unit, wherein said transmission unit has: an authentication means on the transmission side for carrying out authentication for said reception unit that is connected to said bridge unit or for said network; and an authentication number counting means of counting the authentication number that is the number of the authentications carried out by said authentication means on the transmission side, wherein said reception unit has an authentication means on the reception side that carries out authentication for said transmission unit connected to said bridge unit or for said other network, and wherein said authentication number counted by said authentication means on the transmission side is limited.

Still another aspect of the present invention is a copyright protection method of transmitting data requiring copy protection from a transmission unit, by utilizing a network, to at least one, or more, reception unit that is connected to said network and that receives and utilizes said data requiring copyright protection, wherein that copyright protection method is characterized in that said transmission unit counts the authentication number that is the number of authentications carried out on said reception unit, and in that said authentication number is limited.

Yet still another aspect of the present invention is a medium that can be processed by a computer and that is a medium holding a program for allowing a computer to function as the entirety, or a part, of:

the authentication means on the reception side in said reception unit for carrying out authentication for said authentication means on the transmission side;

the authentication means on the transmission side in said transmission unit for carrying out authentication for said reception unit; and the authentication number counting means of counting the authentication number that is the number of authentications carried out by said authentication means on the transmission side, in the copyright protection system.

Still yet another aspect of the present invention is a program for allowing a computer to function as the entirety, or a part, of:

the authentication means on the reception side in said reception unit for carrying out authentication for said authentication means oh the transmission side;

the authentication means on the transmission side in said transmission unit for carrying out authentication for said reception unit; and the authentication number counting means of counting the authentication number that is the number of authentications carried out by said authentication means on the transmission side, in the copyright protection system.

Here, another aspect is the transmission unit characterized in that the above authentication number counting means adds the above authentication number when the above authentication means on the transmission side successfully carries out authentication.

In addition, another aspect of the invention is the transmission unit characterized in that the above reception unit does not again request authentication as long as the above authentication is not reset due to a predetermined cause in the case that authentication is successfully carried out on the above authentication means on the transmission side.

In addition, another aspect is the transmission unit characterized by comprising a bridge unit for connecting the above network to another network, wherein the bridge unit is handled in the same manner as the above reception unit in the above network to which the transmission unit is connected, and wherein the above bridge unit can again request authentication.

In addition, another aspect is the transmission unit characterized in that the above authentication means on the transmission side does not accept the authentication request even if there is, again, an authentication request from the above reception unit as long as the above authentication is not reset due to a predetermined cause in the case that authentication is successfully carried out on the above reception unit.

In addition, another aspect is the transmission unit characterized by comprising a bridge unit for connecting the above network to another network, wherein the bridge unit is handled in the same manner as the above reception unit in the above network to which the transmission unit is connected, and wherein the above authentication means on the transmission side accepts an authentication request in the case that the authentication request is carried out from the above bridge unit.

In addition, another aspect is the transmission unit characterized in that the above authentication means on the transmission side carries out authentication again on the above reception unit in the case that authentication is successfully carried out on the above reception unit while the above authentication number counting means does not add the above authentication number even if the authentication is successful as long as the above authentication is not reset due to a predetermined cause.

In addition, another aspect is the transmission unit characterized by comprising a bridge unit for connecting the above network to another network, wherein the bridge unit is handled in the same manner as the above reception unit in the above network to which the transmission unit is connected, and wherein the above authentication number counting means adds the above authentication number in the case that authentication is, again, carried out successfully on the above bridge unit.

In addition, another aspect is the transmission unit characterized by having:

a registration means of registering information that specifies the above reception unit in the case that the above authentication means on the transmission side successfully carries out authentication for the above reception unit; and a redundancy determination means of determining whether or not an authentication request is from the above reception unit, on which the authentication has already been carried out successfully, by utilizing the registered information that specifies the above reception unit when the authentication request is required by the above reception unit.

In addition, another aspect is the transmission unit characterized in that said reset of authentication occurs at the time when the update of the key is carried out.

In addition, another aspect is the transmission unit characterized in that said reset of authentication occurs at the time when the update of the exchange key is carried out.

In addition, another aspect is the transmission unit, characterized by comprising a bridge unit for connecting the above network to another network, wherein the bridge unit is handled in the same manner as the above reception unit in the above network to which the transmission unit is connected, and wherein the above reset of authentication is carried out in the above other network in the case that the above authentication means on the transmission side carries out the above update of the key.

In addition, another aspect is the transmission unit, characterized in that the above reset of authentication occurs at the time when a bus reset is carried out.

In addition, another aspect is the transmission unit characterized by comprising a bridge unit for connecting the above network to another network, wherein the bridge unit is handled in the same manner as the above reception unit in the network to which the transmission unit is connected, and wherein the above reset of authentication is carried out in the above other network in the case that the above bus reset is carried out in the above network to which the transmission unit is connected.

In addition, another aspect is the transmission unit characterized in that the limitation of the above authentication number indicates that the above authentication means on the transmission side does not accept an authentication request from the above reception unit in the case that the above authentication number becomes a predetermined value, or greater.

In addition, another aspect is the transmission unit characterized in that the above authentication number counting means subtracts the above authentication number in the case that the above reception unit that has successfully carried out authentication for said authentication means on the transmission side stops the utilization of the above data requiring copyright protection that is sent from the transmission unit.

In addition, another aspect is the transmission unit characterized by comprising a bridge unit for connecting said network to another network, wherein the bridge unit is handled in the same manner as said reception unit in said network to which the transmission unit is connected, and wherein "the above bridge unit stops the utilization of the above data requiring copyright protection that is sent from the transmission unit" indicates that all of the above reception units connected to the above other network stop the utilization of the above data requiring copyright protection sent from the transmission unit.

In addition, another aspect is the transmission unit characterized by comprising a registration means of registering information that specifies the above reception unit that has successfully carried out authentication for the above authentication means on the transmission side, wherein the above registration means cancels the registration of the information that specifies the reception unit that has successfully carried out authentication for the above authentication means on the transmission side.

In addition, another aspect is the transmission unit characterized in that the above reception unit is provided with an examination means of examining whether or not the utilization of the above data requiring copyright protection is stopped.

In addition, another aspect is the transmission unit characterized in that to stop the utilization of the above data requiring copyright protection indicates that the above reception unit is detached from the above network, and the above examination means periodically examines whether or not said reception unit is detached from the above network.

In addition, another aspect is the transmission unit characterized in that the examination in the above indicates the periodic examination of the connection number that is the number of the above reception unit connected to the above network and the checking of which of the above reception units is detached from the above network in the case that the above connection number is reduced.

In addition, another aspect is the transmission unit characterized in that the above examination means examines the operation condition of the above reception unit and/or the active condition of the connection plug and, thereby, checks whether or not the above reception unit has stopped the utilization of the above data requiring copyright protection, and the above authentication number counting means subtracts the above authentication means in the case that the above reception unit does not utilize the above data requiring copyright protection as a result of the above examination by the examination means.

In addition, another aspect is the transmission unit characterized in that the above examination means has a correspondence table that makes information for specifying said reception unit correspond to the signature of this reception unit, the above examination means determines whether or not authentication has been carried out on the above reception unit that is detached from the above network by utilizing the above correspondence table, and the above authentication number counting means subtracts the above authentication number in the case that the above determination result indicates that authentication has been carried out on the above reception unit that is detached from the above network.

In addition, another aspect is the transmission unit characterized in that the above authentication means on the transmission side carries out a decrement authentication request on the above authentication means on the transmission side for subtracting the above authentication number in the case that the above reception unit stops the utilization of the above data requiring copyright protection that is transmitted from the transmission unit, the above authentication means on the transmission side carries out the above decrement authentication for the above authentication means on the reception side, and the above authentication number counting means subtracts the above authentication number when the above decrement authentication is successful.

In addition, another aspect is the transmission unit characterized in that a command for decrement authentication that is a command for carrying out the above decrement authentication is prepared separately from an authentication command that is a command for carrying out authentication at the time of utilization of the above data requiring copyright protection.

In addition, another aspect is the transmission unit characterized in that the above data requiring copyright protection is encrypted, and the above reception unit abandons the key for decoding the above data requiring copyright protection when the above decrement authentication is successful.

In addition, another aspect is the transmission unit characterized in that the above decrement authentication differs from the authentication for utilizing the above data requiring copyright protection in, at least, one or more of the signature, the authentication method or the operational equation.

In addition, another aspect is the transmission unit characterized in that the above authentication number counting means initialized the above authentication number and the above registration means cancels all of the registrations of information for specifying a reception unit that has successfully carried out authentication for the above authentication means on the transmission side in the case that authentication is reset due to a predetermined cause.

In addition, another aspect is the reception unit characterized in that the above authentication number counting means adds the above authentication number when the above authentication means on the transmission side successfully carries out authentication.

In addition, another aspect is the reception unit characterized in that the above authentication means on the reception side does not, again, carry out an authentication request as long as the above authentication is not reset due to a predetermined cause in the case that authentication is successfully carried out on the above transmission unit.

In addition, another aspect is the reception unit characterized by comprising a bridge unit for connecting the above network to another network, wherein the bridge unit is handled in the same manner as a reception unit in the above network to which the above transmission unit is connected, and wherein the above bridge unit can again carry out an authentication request.

In addition, another aspect is the reception unit characterized in that the above transmission unit does not accept an authentication request when the authentication request is again required by the above authentication means on the reception side as long as the above authentication is not reset due to a predetermined cause in the case that authentication is successfully carried out on the above authentication means on the reception side.

In addition, another aspect is the reception unit characterized by being a bridge unit for connecting the above network to another network, wherein the bridge unit is handled in the same manner as the reception unit in the above network to which the above transmission unit is connected, and wherein the above transmission unit accepts an authentication request in the case that the authentication request is carried out by the above bridge unit.

In addition, another aspect is the reception unit characterized in that the above transmission unit carries out authentication, again, on the above authentication means on the reception side in the case that authentication is successfully carried out on the above authentication means on the reception side while the above authentication number counting means does not add the above authentication number, even if the authentication is successful, as long as the above authentication is not reset due to a predetermined cause.

In addition, another aspect is the reception unit characterized by being a bridge unit for connecting the above network to another network, wherein the bridge unit is handled in the same manner as the reception unit in the above network to which the above transmission unit is connected, and wherein the above authentication number counting means adds the above authentication number in the case that authentication is again carried out successfully on the above bridge unit.

In addition, another aspect is the reception unit characterized in that the above authentication means on the transmission side has: a registration means of registering information that specifies the above authentication means on the reception side in the case that authentication is successfully carried out for the above authentication means on the reception side; and a redundancy determination means of determining whether or not an authentication request is an authentication request from the above authentication means on the reception side for which authentication has already been successfully carried out by utilizing the registered information that specifies the above authentication means on the reception side when an authentication request is carried out by the above authentication means on the reception side.

In addition, another aspect is the reception unit characterized in that the above reset of authentication occurs at the time when the update of the key is carried out.

In addition, another aspect is the reception unit characterized in that the above reset of authentication occurs at the time when the update of the exchange key is carried out.

In addition, another aspect is the reception unit characterized by being a bridge unit for connecting the above network to another network, wherein the bridge unit is handled in the same manner as a reception unit in the above network to which the above transmission unit is connected, and wherein the above reset of authentication is carried out in the above other network in the case that the above transmission unit carries out the above update of the key.

In addition, another aspect is the reception unit characterized in that the above reset of authentication occurs at the time when a bus reset is carried out.

In addition, another aspect is the reception unit characterized by being a bridge unit for connecting the above network to another network, wherein the bridge unit is handled in the same manner as a reception unit in the above network to which the above transmission unit is connected, and wherein the above reset of authentication is carried out in the above other network in the case that the above bus reset is carried out in the above network to which the transmission unit is connected.

In addition, another aspect is the reception unit characterized in that the above limitation in the authentication number indicates that the above authentication means on the transmission side does not accept an authentication request from the above authentication means on the reception side in the case that the above authentication number becomes a predetermined value, or greater.

In addition, another aspect is the reception unit characterized in that the above authentication number counting means subtracts the above authentication number in the case that the above authentication means on the reception side that has successfully carried out authentication for the above authentication means on the transmission side stops the utilization of the above data requiring copyright protection that is transmitted from the above transmission unit.

In addition, another aspect is the reception unit characterized by being a bridge unit for connecting the above network to another network, wherein the bridge unit is handled in the same manner as a reception unit in the above network to which the above transmission unit is connected, and wherein "the above bridge unit stops the utilization of the above data requiring copyright protection that is transmitted from the above transmission unit" indicates that all of the reception units connected to the above other network stop the utilization the above data requiring copyright protection transmitted from the above transmission unit.

In addition, another aspect is the reception unit characerized in that the above transmission unit has a registration means of registering information that specifies the above authentication means on the reception side that has successfully carried out authentication for the above authentication means on the transmission side, and the above registration means cancels the registration of the information that specifies the above authentication means on the reception side that has successfully carried out authentication for the above authentication means on the transmission side in the case that the above authentication number counting means subtracts the above authentication number.

In addition, another aspect is the reception unit characerized in that the above transmission unit has an examination means of examining whether or not the reception unit has stopped the utilization of the above data requiring copyright protection.

In addition, another aspect is the reception unit characerized in that to stop the utilization of the above data requiring copyright protection indicates that the above reception unit is detached from the above network, and the above examination means periodically examines whether or not the above reception unit is detached from the above network.

In addition, another aspect is the reception unit characerized in that the above examination indicates the periodic examination of the connection number that is the number of reception units connected to the above network and the checking of which reception unit is detached from the above network in the case that the above connection number is reduced.

In addition, another aspect is the reception unit characerized in that the above examination means checks if the reception unit has stopped the utilization of the above data requiring copyright protection by examining the operational condition of the above reception unit and/or the active condition of the connection plug, and the above authentication number counting means subtracts the above authentication number in the case that the above reception unit does not utilize the above data requiring copyright protection as a result of the above examination by the examination means.

In addition, another aspect is the reception unit characerized in that the above examination means has a correspondence table for making information that specifies the reception unit correspond to the signature of this reception unit, the above examination means determines whether or not authentication has been carried out on the above reception unit that is detached from the above network by utilizing the above correspondence table, and the above authentication number counting means subtracts the above authentication number in the case that the above determination result indicates that authentication has been carried out on the above reception unit that is detached from the above network.

In addition, another aspect is the reception unit characerized in that the above authentication means on the reception side carries out a decrement authentication request on the above transmission unit to subtract the above authentication number in the case that the reception unit stops the utilization of the above data requiring copyright protection that is transmitted from the above transmission unit, the above authentication means on the transmission side carries out the above decrement authentication for the above authentication means on the reception side, and the above authentication number counting means subtracts the above authentication number in the case that the above decrement authentication is successful.

In addition, another aspect is the reception unit characerized in that a command for decrement authentication that is a command for carrying out the above decrement authentication is prepared separately from an authentication command that is a command for carrying out authentication at the time of the utilization of the above data requiring copyright protection.

In addition, another aspect is the reception unit characerized in that the above data requiring copyright protection is encrypted, and the reception unit abandons the key for decoding the above data requiring copyright protection when the above decrement authentication is successful.

In addition, another aspect is the reception unit characerized in that the above decrement authentication differs from the authentication for utilizing the above data requiring copyright protection in, at least, one or more of the signature, the authentication method and the operational equation.

In addition, another aspect is the reception unit characerized in that the above authentication number counting means initializes the above authentication number and the above registration means cancels all of the registrations of information that specify the reception unit that have successfully carried out authentication for the above authentication means on the transmission side in the case that the authentication is reset due to a predetermined cause.

In addition, another aspect is the bridge unit characerized by being handled in the same manner as the above transmission unit in the above other network, wherein, in the case that an authentication request is carried out by the above reception unit connected to the above other network, the above authentication means on the reception side for the bridge unit carries out authentication for the above transmission unit that is connected to the above network before the above authentication means on the transmission side for the bridge unit carries out authentication for the reception unit and in the case that the authentication of this transmission unit is successful, the above authentication means on the transmission side for the bridge unit carries out authentication for the above reception unit.

In addition, another aspect is the bridge unit characerized in that the above authentication means on the reception side for the bridge unit carries out decrement authentication for subtracting the above authentication number, which is counted by the above authentication number counting means of the above transmission unit connected to the above network, on the above transmission unit connected to the above network in the case that subtraction is carried out on the above authentication number counting means of the bridge unit.

In addition, another aspect is the bridge unit characerized in that the above authentication number counting means of the bridge unit counts the authentication number that is the number of the successful authentications carried out by the above authentication means on the transmission side for the bridge unit on the above reception unit connected to the above other network.

In addition, another aspect is the bridge unit characerized in that the above authentication means on the reception side for the above bridge unit carries out authentication for the above transmission unit that is newly connected according to the number of times the above authentication number that is counted by the above authentication number counting means of the bridge unit in the case that the above transmission unit is newly connected to the above network.

In addition, another aspect is the bridge unit characerized by comprising a key counting means of counting the limitation number of the permissions allocated by the above transmission unit connected to the above network, wherein the above authentication number counting means of the bridge unit counts the above authentication number that is the number of successful authentications carried out on the above reception unit connected to the above other network, the number of successful authentications that are carried out on the above transmission unit connected to the above network is assumed to be the above limitation number of the permissions counted by the above key counting means, wherein the above authentication means on the reception side for the bridge unit does not carried out decrement authentication for the above transmission unit that is connected to the above network but, rather, the above authentication means on the transmission side for the bridge unit carries out decrement authentication for the reception unit in the case that a decrement authentication request for subtracting the above authentication number that is counted by the above authentication number counting means of the bridge unit is carried out by the above reception unit connected to the above other network, wherein the above authentication number counting means of the bridge unit subtracts the above authentication number when the above decrement authentication is successful, wherein the authentication means on the transmission side for the bridge unit carries out authentication for the reception unit in the case that the above limitation number of the permissions is smaller than the above authentication number that is counted by the above authentication number counting means of the bridge unit at the time when an authentication request is newly carried out by the above reception unit connected to the above other network, and wherein the above authentication means on the reception side for the bridge unit carries out authentication for the above transmission unit connected to the above network before authentication is carried out on the reception unit in the case that the above limitation number of permissions is not smaller than the above authentication number counted by the above authentication number counting means of the bridge unit and, in the case that the authentication is successful, the above authentication means on the transmission side for the bridge unit carries out authentication for the reception unit.

In addition, another aspect is the bridge unit, wherein the above bridge unit comprises a key counting means of counting the limitation number of the permissions allocated by the above transmission unit that is connected to the above network, wherein the data sent from the above transmission unit that is connected to the above network is again encrypted so as to be transmitted to the above reception unit that is connected to the above other network, and wherein the above authentication number counting means of the bridge unit counts the authentication number that is the successful number of authentications carried out on the above reception unit that is connected to the above other network by the above authentication means on the transmission side for the bridge unit.

In addition, another aspect is the bridge unit characterized by permitting an authentication request when the authentication request is carried out by the above reception unit that is connected to the above other network in the case that the above authentication number counted by the above authentication number counting means of the bridge unit and the above limitation number of permissions counted by the above key counting means are greater than the above authentication number counted by the above authentication number counting means of the bridge unit.

In addition, another aspect is the bridge unit characterized in that the upper limit of the limitation number of permissions counted by the above key counting means is given in advance by the above transmission unit that is connected to the above network.

In addition, another aspect is the bridge unit characterized in that the upper limit of the limitation number of permissions counted by the above key counting means is added by the above authentication means on the reception side for the bridge unit carrying out authentication for the above transmission unit that is connected to the above network.

In addition, another aspect is the bridge unit characterized in that the above authentication means on the transmission side for the bridge unit rejects an authentication request when the authentication request is carried out by the above reception unit that is connected to the above other network in the case that the above limitation number of permissions counted by the above key counting means is not greater than the above authentication number counted by the above authentication number counting means of the bridge unit.

In addition, another aspect is the bridge unit characterized in that the above authentication means on the transmission side for the bridge unit calls on the above transmission unit that is connected to the above network to add the above limitation number of permissions when an authentication request is carried out by the above reception unit that is connected to the above other network in the case that the above limitation number of permissions counted by the above key counting means is not greater than the above authentication number counted by the above authentication number counting means of the bridge unit.

In addition, another aspect is the bridge unit characterized in that the above authentication means on the reception side for the bridge unit carries out an authentication request on the above transmission unit that is connected to the above network and in the case that the above authentication is successful, the above key counting means adds the above limitation number of permissions when an authentication request is carried out by the above reception unit connected to the above other network in the case that the above limitation number of permissions counted by the above key counting means is not greater than the above authentication number counted by the above authentication number counting means of the bridge unit.

In addition, another aspect is the bridge unit characterized in that the above authentication means on the reception side for the bridge unit makes a notification of the number of the above reception units that are connected to the above other network and that carry out an authentication request to the above transmission unit that is connected to the above network whenever an authentication request is carried out by the above reception unit connected to the above other network on the above authentication means on the transmission side for the bridge unit.

In addition, another aspect is the bridge unit characterized in that an authentication command for carrying out an authentication request on the above transmission unit connected to the above network by the above authentication means on the reception side for the bridge unit is provided with a field for making the above notification of the number and the above authentication means on the reception side for the bridge unit makes the above notification of the number by utilizing the above field.

In addition, another aspect is the bridge unit characterized in that an authentication command for carrying out an authentication request on the above transmission unit connected to the above network by the above authentication means on the reception side for the bridge unit is discriminated from an authentication command for carrying out an authentication request on the above transmission unit connected to the above network by the above reception unit that is connected to the above network and does not have a function to the above bridge unit.

In addition, another aspect is the bridge unit characterized in that the above discrimination is carried out by the signature attached to the above authentication command.

BRIEF DESCRIPTION OF THE DRAWINGS

FIG. 4 is a diagram showing examples of authentication numbers counted by an authentication number counting means and device information stored by a device information storage means according to the first embodiment of the present invention;

FIG. 6 is a diagram showing examples of authentication numbers counted by an authentication number counting means and device information stored by a device information storage means according to the second embodiment of the present invention;

EXPLANATION OF NUMERALS

Figure 1:
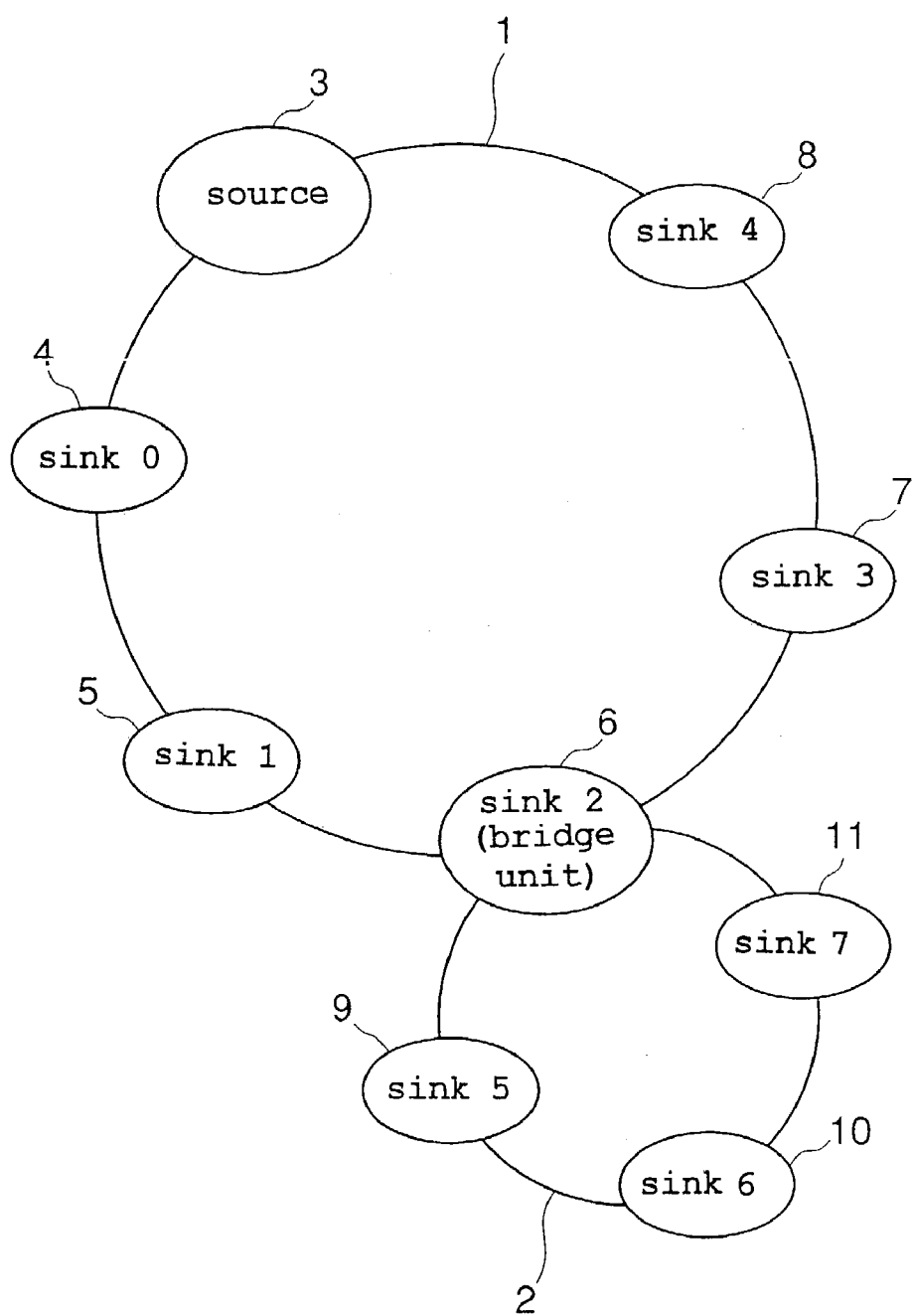
FIG. 1 is a diagram showing the configuration of a copyright protection system according to the first to seventh embodiments of the present invention.

1 IEEE 1394 bus #1
2 IEEE 1394 bus #2
3 source
4 sink 0
5 sink 1
6 sink 2 (bridge unit)
7 sink 3
8 sink 4
9 sink 5
20 STB
21 D-I/F on transmission side
22 encryption means
23 authentication means on transmission side
24 authentication number counting means
25 upper limit authentication number storage means
26 count adjustment and determination means
27 device information storage means
28 authentication selection means on the transmission side
29 authentication rule storage means on the transmission side
30 TV
31 D-I/F on the reception side
32 decoding means
33 authentication request means
34 authentication means on the reception side
35 authentication selection means on the reception side
36 authentication rule storage means on the reception side

PREFERRED EMBODIMENTS FOR CARRYING OUT THE INVENTION

In the following, the embodiments of the present invention are described in reference to the drawings.

First Embodiment

First, the first embodiment is herein described.

FIG. 1 shows a copyright protection system according to the present embodiment.

In the copyright protection system according to the present embodiment, IEEE 1394 bus #1 (1) and IEEE 1394 bus #2 (2) are connected to each other by means of a sink 2 (bridge unit) (6) while source 3, sink 0 (4), and the like, are connected to IEEE 1394 bus #1 (1). In addition, sink 5 (9), sink 6 (10), and the like, are connected to IEEE 1394 bus #2 (2).

IEEE 1394 bus #1 (1) and IEEE 1394 bus #2 (2) are, respectively, different IEEE 1394 buses.

The source 3 is an apparatus for transmitting AV data requiring copyright protection to IEEE 1394 bus #1 (1) and is, for example, an STB (set top box).

The sink 0 (4), the sink 1 (5), the sink 3 (7) and the sink 4 (8) are connected to IEEE 1394 bus #1 (1) and are apparatuses receiving and utilizing AV data requiring copyright protection transmitted from the source 3 and are, for example, TVs (televisions).

The sink 5 (9), the sink 6 (10) and the sink 7 (11) are connected to IEEE 1394 bus #2 (2) and are apparatuses receiving and utilizing AV data requiring copyright protection transmitted to IEEE 1394 bus #2 (2) and are, for example, TVs (televisions).

The bridge unit 6 is a unit for receiving, for reencrypting and, then, for transmitting AV data requiring copyright protection transmitted from the source 3. Since the bridge unit 6 relays the transmission of AV data, the AV data requiring copyright protection transmitted from the source 3 that is connected to IEEE 1394 bus #1 (1) can be received by the sink 5 (9), or the like, connected to IEEE 1394 bus #2 (2).

Figure 2:
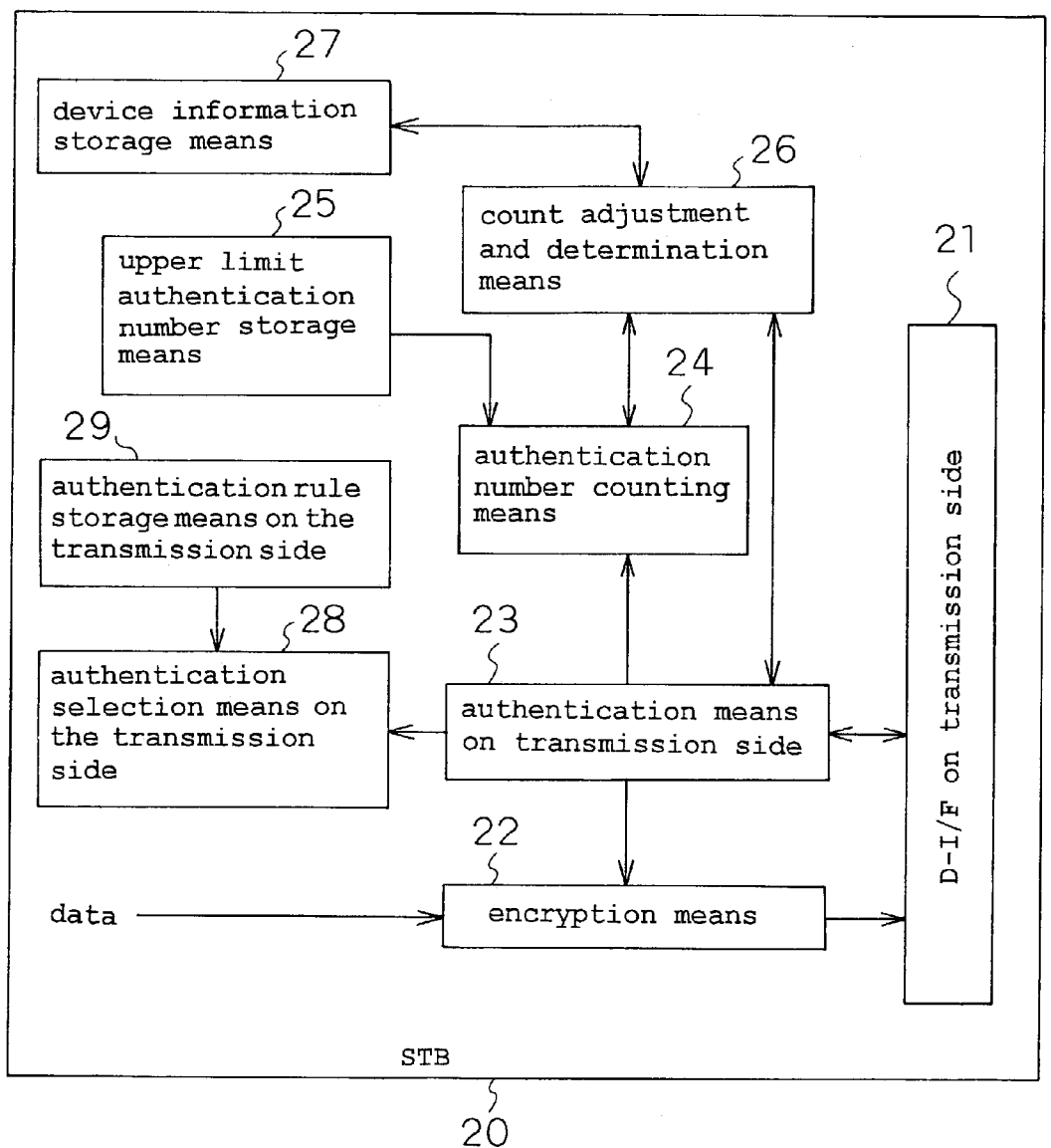
FIG. 2 is a diagram showing the configuration of an STB according to the first embodiment of the present invention.

FIG. 2 shows the configuration of the source 3. FIG. 2 shows the source 3 as an STB 20.

The STB 20 is formed of a D-I/F 21 on the transmission side, an encryption means 22, an authentication means 23 on the transmission side, an authentication number counting means 24, an upper limit authentication number storage means 25, a count adjustment and determination means 26 and a device information storage means 27.

The D-I/F 21 on the transmission side is a digital interface for transmitting the AV data requiring copyright protection to the IEEE 1394 bus #1 (1) as an isochronous packet and for transmitting and receiving a command, or the like, in an asynchronous packet to and from another apparatus connected to IEEE 1394 bus #1 (1).

The encryption means 22 is a means of encrypting AV data received from a tuner (not shown).

The authentication means 23 on the transmission side is a means of carrying out authentication for utilizing the apparatuses connected to IEEE 1394 bus #1 (1), such as sink 0 (4), sink 1 (5), and the like, as well as AV data and of carrying out a decrement authentication that is an authentication for stopping the utilization of AV data. The authentication for utilizing this AV data (hereinafter, references to authentication, alone, indicate authentication for utilizing the AV data) and the decrement authentication (hereinafter, the authentication for stopping the utilization of AV data is referred to as decrement authentication) that is an authentication for stopping the utilization of the AV data are carried out according to different authentication rules.

The authentication number counting means 24 is a means of counting the authentication number that is the number of authentications that have been successfully carried out by the authentication means 23 on the transmission side in accordance with the determination result of the count adjustment and determination means 26.

The upper limit authentication number storage means 25 is a means of storing the upper limit of the number of apparatuses that can simultaneously receive and utilize AV data requiring copyright protection transmitted by the STB 20.

The device information storage means 27 is a means of storing device IDs of the apparatuses on which authentication has been successfully carried out by the authentication means 23 on the transmission side. Here, the device IDs are assigned in advance by a key management center and are information for specifying the apparatuses.

The count adjustment and determination means 26 is a means of determining, in the case that the authentication means 23 on the transmission side has successfully carried out authentication by utilizing a device ID that is stored in the device information storage means 27, whether or not the authentication number counted by the authentication number counting means 24 is increased by checking if the authentication is the duplicated authentication for the same apparatus and for determining whether or not the authentication number counted by the authentication number counting means 24 is decreased in the case that the authentication means 23 on the transmission side has successfully carried out the below described decrement authentication.

An authentication rule storage means 29 on the transmission side is a means of storing respective authentication rules of the authentication and the decrement authentication carried out by the authentication means 23 on the transmission side.

An authentication selection means 28 on the transmission side is a means of selecting, at the time when the authentication means 23 on the transmission side carries out authentication, the authentication rule thereof and for selecting, at the time when decrement authentication is carried out, the authentication rule for the decrement authentication thereof.

Figure 3:
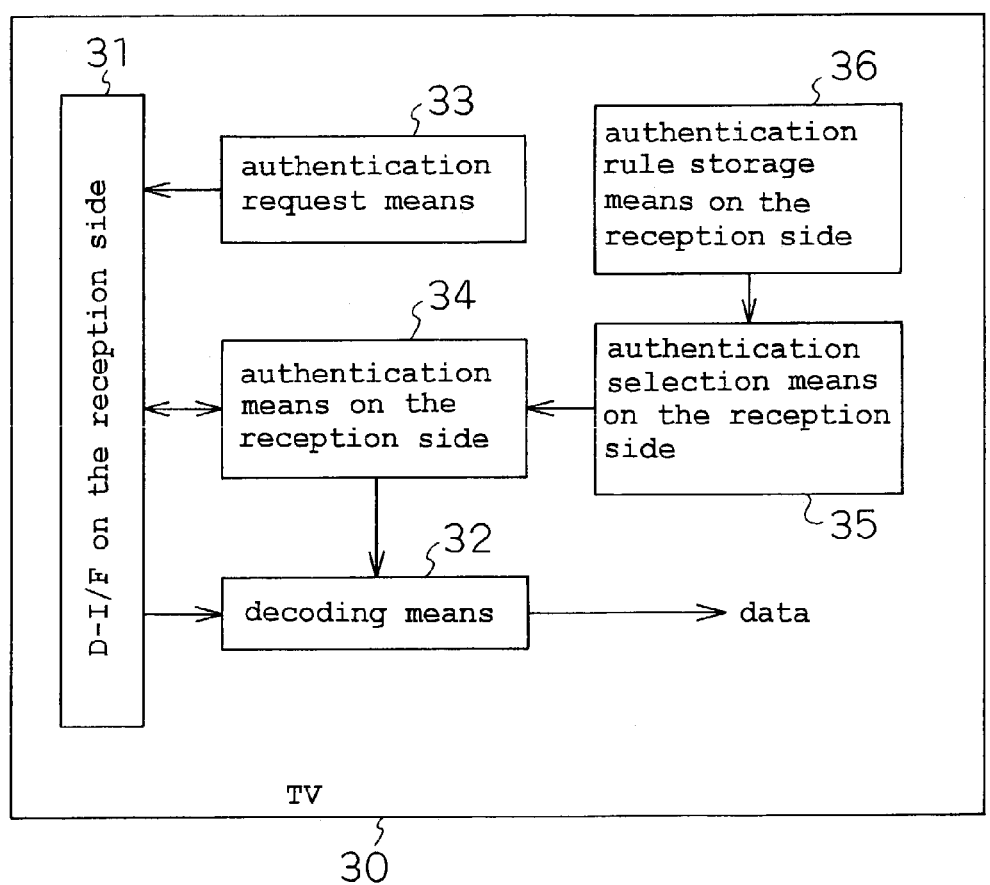
FIG. 3 is a diagram showing the configuration of a TV 30 according to the first, second, seventh and eighth embodiments of the present invention.

The sink 0 (4), the sink 1 (5), the sink 3 (7) and sink 4 (8) respectively have a similar configuration. FIG. 3 shows the configuration of one sink, that is TV 30.

The TV 30 is formed of a D-I/F 31 on the reception side, a decoding means 32, an authentication request means 33, an authentication means 34 on the reception side, an authentication selection means 35 on the reception side and an authentication rule storage means 36 on the reception side.

The authentication selection means 35 on the reception side is a digital interface for receiving AV data requiring copyright protection that is transmitted to IEEE 1394 bus #2 (2) as an isochronous packet and for transmitting and receiving a command, or the like, to and from another apparatus connected to IEEE 1394 bus #1 (1) in an asynchronous packet.

The decoding means 32 is a means of decoding the encryption of the received AV data requiring copyright protection. The AV data decoded by the decoding means 32 to plain text is decoded by a decoder (not shown) and is displayed on a monitor (see the figure).

The authentication request means 33 is a means of transmitting, to the STB 20, an authentication command (hereinafter referred to as authentication command) for carrying out a request for authentication and an authentication command (hereinafter referred to as command for decrement authentication) for decrement authentication that requests the carrying out of decrement authentication. Different commands are used for the authentication command for carrying out authentication and the authentication command for carrying out decrement authentication.

The authentication means 34 on the reception side is a means of carrying out authentication and decrement authentication for the authentication means 23 on the transmission side of the STB 20.

The authentication selection means 35 on the reception side is a means of selecting an authentication rule for authentication at the time when the authentication means 34 on the reception side carries out authentication and for selecting an authentication rule for decrement authentication at the time when authentication means 34 on the reception side carries out decrement authentication.

The authentication rule storage means 36 on the reception side is a means of storing authentication rules for authentication and authentication rules for decrement authentication.

Here, IEEE 1394 bus #1 (1) and IEEE 1394 bus #2 (2) of the present embodiment are examples of a network in the present invention, the source 3, that is to say the STB 20, of the present embodiment is an example of a transmission unit of the present invention, the sink 1 (5), that is to say TV 30, of the present embodiment is an example of a reception unit of the present invention, the authentication rule storage means 29 on the transmission side, the authentication selection means 28 on the transmission side and the authentication means 23 on the transmission side of the present embodiment are examples of an authentication means on the transmission side of the present invention, the upper limit authentication number storage means 25, the authentication number counting means 24 and the count adjustment and determination means 26 of the present embodiment are examples of an authentication number counting means of the present invention, the authentication rule storage means 36 on the reception side, the authentication selection means 35 on the reception side and the authentication means 34 on the reception side of the present embodiment are examples of an authentication means on the reception side of the present invention, the count adjustment and determination means 26 of the present embodiment is an example of a redundancy determination means of the present invention, the device information storage means 27 of the present embodiment is an example of a registration means of the present invention and the decoding of the AV data that has become plain text after being decoded by the decoding means 32 of the present embodiment by the decoder (not shown) and the display thereof on the monitor (see the figure) are examples of the utilization of data requiring copyright protection of the present invention.

Next, the operation of the present embodiment formed in the above manner is described.

First, the operation wherein the sink 1 (5) receives the AV data requiring copyright protection transmitted by the source 3 to IEEE 1394 bus #1 (1) and displays this image and sound on the monitor of sink 1 (5) is described.

The AV data requiring copyright protection is an MPEG transport stream and is received by a tuner, not shown, of the STB 20 that is the source 3. Then, a limitation is assumed to be provided such that a maximum of only three apparatus can simultaneously receive and utilize the AV data requiring copyright protection transmitted by the STB 20 that is the source 3.

Information showing this limitation is contained within the MPEG transport stream at the time that the AV data is transmitted from a broadcasting station. The STB 20 extracts this information from inside of the MPEG transport stream received by a tuner and the upper limit authentication number storage means 25 sets three as the upper limit authentication number by referring to the extracted information.

In order for the STB 20 to transmit the AV data received by the tuner to IEEE 1394 bus #1 (1), first, the D-I/F 21 on the transmission side requests a channel utilization right by designating the transmission band to be utilized in the isochronous resource manager of IEEE 1394 bus #1 (1). Then, the channel utilization right is assumed to have been granted by the isochronous resource manager.

Thus, the encryption means 22 encrypts the AV data requiring copyright protection that is received by the tuner and outputs the result to the D-I/F 21 on the transmission side.

The D-I/F 21 on the transmission side prepares, from the encrypted AV data, a number of isochronous channels in the header and an isochronous packet to which its own node ID is attached and transmits the prepared isochronous packet to IEEE 1394 bus #1 (1).

Thus, the STB 20 transmits the AV data requiring copyright protection to IEEE 1394 bus #1 (1).

FIG. 4 shows how the authentication number counted by the authentication number counting means 24 and the device ID stored in the device information storage means 27 change whenever the apparatus carries out an authentication request. At the present point in time, the STB 20 has not received an authentication request and the authentication number counted by the authentication number counting means 24 is 0 while the device information storage means 27 does not store device ID of any apparatuses.

On the other hand, in the case that the sink 1 (5) receives and utilizes the AV data transmitted by the source 3, first, an authentication request is carried out on the STB 20, which is the source 3.

That is to say, the D-I/F 31 on the reception side of the TV 30 that is the sink 1 (5) receives the transmitted isochronous packet and acquires the node ID of the transmission origin from the header information. Then, the authentication request means 33 outputs an authentication command for requesting authentication to the D-I/F 31 on the reception side. A device ID is allocated in advance to the TV 30 from the key management center so that this device ID can specify each apparatus, such as the TV 30, in an exclusive manner. Then, the device ID of the TV 30 is attached to the authentication command outputted by authentication request means 33.

When receiving an authentication command the D-I/F 30 on the reception side prepares an asynchronous packet wherein the node ID of the transmission origin acquired in advance from the authentication command and the node ID of its own are added to the header and transmits the asynchronous packet to IEEE 1394 bus #1 (1).

Then, the authentication means 34 on the reception side indicates the authentication selection means 35 on the reception side to select an authentication rule for authentication and this is received by the authentication selection means 35 on the reception side, which selects the authentication command for authentication from the authentication rule storage means 36 on the reception side.

The D-I/F 31 on the reception side transmits the authentication command to the STB 20 as an asynchronous packet.

When receiving an authentication command sent as an asynchronous packet from the D-I/F 31 on the reception side of the TV 30, the D-I/F 21 on the transmission side of the STB 20 outputs the authentication command to the authentication means 23 on the transmission side.

The authentication means 23 on the transmission side makes a notification of the device ID of the TV 30 to the count adjustment and determination means 26 and makes a request for determination.

The count adjustment and determination means 26 determines whether or not the device ID received in response to the request from the authentication means 23 on the transmission side has already be stored in the device information storage means 27. Then, referring to the authentication number counted by the authentication number counting means 24 and the upper limit value of the authentication number stored in the upper limit authentication number storage means 25, whether the authentication request from the TV 30 is accepted or rejected is determined in the following manner.

That is to say, in the case that this authentication number is smaller than the upper limit value of the authentication number the authentication command is determined as being acceptable. In addition, in the case that the received device ID has already been stored in the device information storage means 27 even when this authentication number is equal to the upper limit value, or is the value greater than that, the authentication command is determined to be received. Then, in the case that the authentication number is equal to the upper limit value of the authentication number, or is the value greater than that, and the received device ID is not stored in the device information storage means 27, the authentication command from the TV 30 is determined to be rejected.

The authentication means 23 on the transmission side determines whether or not authentication is carried out on the authentication means 34 on the reception side according to the above determination result.

At this point in time, for example, the upper limit number stored by the upper limit authentication number storage means 25 is three and the authentication number counted by the authentication number counting means 24 is zero so that the authentication number is smaller than the upper limit of the authentication number and, therefore, the count adjustment and determination means 26 determines the authentication request to be received and the authentication means 23 on the transmission side carries out authentication for the authentication means 34 on the reception side according to this determination result.

That is to say, the authentication means 23 on the transmission side directs the authentication selection means 28 on the transmission side to select an authentication rule and, in response to this, the authentication selection means 28 on the transmission side selects an authentication rule for authentication from the authentication rule storage means 29 on the transmission side.

The authentication means 23 on the transmission side uses the authentication rule for authentication selected by the authentication selection means 28 on the transmission side while the authentication means 34 on the reception side uses the authentication rule for authentication selected by the authentication selection means 34 on the reception side so that authentication is mutually carried out.

When the TV 30 is found to be an authorized apparatus as a result of the above and the authentication is successful, the authentication means 23 on the transmission side and the authentication means 34 on the reception side exchange keys for encrypting and for decoding AV data. Accordingly, when the authentication is successful, the TV 30 decodes the encryption of the AV data transmitted from the STB 20 with the acquired key so that the image and sound can be displayed on a monitor so as to be viewed and listened to.

In addition, in the case that the TV 30 is an unauthorized apparatus and the authentication has failed the above described exchange of keys is not carried out. Accordingly, in this case, the TV 30 can not decode the encryption of the AV data transmitted by the STB 20 and, therefore, the image and sound can not be displayed on a monitor so as to be viewed and listened to even in the case the AV data is decoded.

In such a manner, the AV data requiring copyright protection is encrypted and transmitted so that an unauthorized apparatus can be removed by carrying out authentication.

In the case that the authentication is successful in such a manner, the authentication means 23 on the transmission side first makes a notification, to the count adjustment and determination means 26, of the device ID of the TV 30 that is added to the authentication command and of the successful authentication.

The count adjustment and determination means 26 checks whether or not the notified device ID of the TV 30 has already been stored in the device information stored by the device information storage means 27 when receiving the notification of the successful authentication.

Then, in the case that the device ID of the TV 30 has not yet been stored in the device information storage means 27, the device ID of the TV 30 is newly stored in the device information storage means 27.

Furthermore, in the case that the device ID of the TV 30 is newly stored in the device information storage means 27, the count adjustment and determination means 26 indicates the authentication number counting means 24 to increase the counted authentication number by one. In the case that the device ID of the TV 30 has already been stored in the device information storage means 27, the authentication number counting means 24 is not indicated so as to increase the counted authentication number.

The authentication number counting means 24 increases the counted authentication number by one in accordance with the indication by the count adjustment and determination means 26.

Accordingly, the authentication number counting means 24 does not count authentications carried out on the same apparatus repeatedly.

Furthermore, the authentication means 23 on the transmission side passes the key exchanged at the time of authentication of the authentication means 34 on the reception side to the encryption means 22.

Afterwards, the encryption means 22 encrypts AV data using the key passed from the authentication means 23 on the transmission side and outputs the result to the D-I/F 21 on the transmission side.

On the other hand, in the case that the authentication of the STB 20 is successful, the authentication means 34 on the reception side outputs the key exchanged at the time of this authentication to the decoding means 32.

Afterwards, the decoding means 32 decodes the AV data transmitted from the STB 20 using the key received from the authentication means 34 on the reception side and the decoded AV data that has become plain text is decoded by a decoder, not shown, and is converted into an analog signal so as to be displayed on a monitor.

The TV 30 that is the sink 1 (5) receives AV data requiring copyright protection that is transmitted from the STB 20, which is the source 3, and displays the data on a monitor.

That is to say, as shown in FIG. 4, the sink 1 (5) requests authentication, and authentication is carried out on the STB 20, and when a successful result is gained the authentication number counted by the authentication number counting means 24 becomes one so that the device ID of the sink 1 (5) is stored in the device information storage means 27.

The operation is described in the above wherein the sink 1 (5) receives the AV data requiring copyright protection transmitted to IEEE 1394 bus #1 (1) by the source 3 and the image and sound are displayed on the monitor of sink 1 (5).

In the same manner as the above described operation, it is assumed that the sink 0 (4) receives the AV data requiring copyright protection that is transmitted to IEEE 1394 bus #1 (1) by the source 3 so that the image and sound can be displayed on the monitor. That is to say, the sink 0 (4) and the source 3 carry out authentication and, as a result, the authentication is successful.

That is to say, when the authentication means 23 on the transmission side receives an authentication request from the sink 0 (4) at the time of authentication carried out by the sink 0 (4) and the source 3, a request is made to the count adjustment and determination means 26 for a determination of whether or not the authentication request is acceptable.

The count adjustment and determination means 26 determines to receive the authentication since the authentication number counted by the authentication number counting means 24 is one and the upper limit number stored in the upper limit authentication number storage means 25 is three so that the authentication number is still smaller than the upper limit number.

Then, the authentication means 23 on the transmission side carries out authentication for the sink 0 (4) in accordance with this determination.

When the authentication is successful, the count adjustment and determination means 26 checks whether or not the device ID of the sink 0 (4) has already been stored in the device information storage means 27. At this point in time, the device ID stored in the device information storage means 27 is the-device ID of the sink 1 (5) only and, therefore, the device ID of the sink 0 (4) has not yet been stored. Accordingly, the authentication number counting means 24 indicates to increase the counted authentication number by one.

The authentication number counting means 24 increases the authentication number by one in accordance with the indication from the count adjustment and determination means 26. Accordingly, the authentication number counted by the authentication number counting means 24 becomes two at this point in time.

Afterwards the sink 0 (4) decodes the AV data transmitted from the source 3 in the same manner as described above so that the image can be displayed on a monitor.

That is to say, as shown in FIG. 4, the sink 0 (4) carries out an authentication request while the STB 20 and the sink 0 (4) carries out authentication and when they are successful the authentication number counted by the authentication number counting means 24 is increased to two and a sink 1 (5) is added to the device information storage means 27 so that the device IDs of the sink 1 (5) and the sink 0 (4) are stored.

Here, when the sink 3 (7) carries out an authentication request on the source 3 so that the authentication is successful, the authentication number counted by the authentication number counting means 24 becomes 3 so that the device information storage means 27 stores the device IDs of the sink 0 (4), the sink 1 (5) and the sink 3 (7).

That is to say, the number of apparatuses that display the AV data transmitted by the source 3 on a monitor is three at this point in time.

That is to say, as shown in FIG. 4, the sink 3 (7) carries out an authentication request while the STB 20 and the sink 3 (7) carry out authentication and when they are successful, the authentication number counted by the authentication number counting means 24 is increased to three and a sink 3 (7) is added to the device information storage means 27 so that the device IDs of the sink 1 (5), the sink 0 (4) and the sink 3 (7) are stored.

Here, a sink 4 (8) is assumed to have carried out an authentication request on the source 3 as the fourth apparatus. When receiving an notification that the device ID and authentication of the sink 4 (8) are requested by the authentication means 23 on the transmission side, the count adjustment and determination means 26 determines whether or not the authentication command is accepted in the same manner as in the above. In this case, the device IDs of the sink 0 (4), the sink 1 (5) and the sink 3 (7) are registered with the device information storage means 27 while the device ID of the sink 4 (8) is not registered. Then, the authentication number counted by the authentication number counting means 24 is three while the upper limit number stored by the upper limit authentication number storage means 25 is three.

Accordingly, the device ID of the sink 4 (8) is not registered with the device information storage means 27 and the authentication number and the upper limit number become equal so that the count adjustment and determination means 26 determines that the authentication command from the sink 4 (8) should be rejected. The authentication means 23 on the transmission side rejects the authentication request from the sink 4 (8) in accordance with this determination and, thereby, this authentication fails.

Accordingly, the sink 4 (8) can not decode the encryption of the AV data transmitted from the source 3 and can not display the image and sound on a monitor.

That is to say, as shown in FIG. 4, when the sink 4 (8) carries out an authentication request the STB 20 rejects the authentication request so that the count number counted by the authentication number counting means 24 and the device ID stored by the device information storage means 27 do not change.

In addition, in the case that an apparatus such as the sink 0 (4) that has already succeeded in authentication carries out an authentication request repeatedly, the device ID of the sink 0 (4) has already been stored in the device information storage means 27 so that the authentication means 23 on the transmission side carries out authentication even though the authentication number counted by the authentication number counting means 24 is not smaller than the upper limit number. Then, even when the authentication is successful the authentication number counting means 24 does not increase the counted authentication number. Here, in the case that a bridge unit such as the sink 2 (bridge unit) (6) carries out an authentication request again, the authentication number counting means 24 increases the counted authentication number as an exception. Then, an authentication request from a bridge unit has a different format as that of an authentication request from an apparatus that is not a bridge unit. A bridge unit, for example, is given a signature that is different from that of an apparatus that is not a bridge unit from the key management center. Accordingly, the source 3 can determine whether or not the apparatus that has carried out an authentication request is a bridge unit from the signature attached to the authentication command.

That is to say, as shown in FIG. 4, in the case that the sink 0 (4) carries out an authentication request again, the authentication is carried out and, as a result, when the authentication is successful the authentication number counted by the authentication number counting means 24 stays at three while the device IDs stored by the device information storage means 27 stay at those of the sink 1 (5), the sink 0 (4) and the sink 3 (7).

Thus, the source 3 rejects the authentication request from the sink that has not yet carried out authentication in the case that the authentication number exceeds the upper limit number. Accordingly, the number of the sinks that can receive the AV data transmitted by the source 3 so that the image and sound are displayed on a monitor can be limited to three at a maximum.

Next, in the case that the sink 1 (5) stops displaying the AV data transmitted from the source 3 on a monitor, the sink 1 (5) makes a notification to the source 3 by carrying out decrement authentication. The operation of this case is described in the following.

The authentication request means 33 of the TV 30 that is the sink 1 (5) outputs a command for decrement authentication to the D-I/F 31 on the reception side in order to make a notification that it stops displaying the AV data on a monitor.

This command for decrement authentication is provided separately from the authentication command for authentication that is carried out in advance at the time when AV data is displayed on a monitor. That is to say, an authentication command and an command for decrement authentication differ in the signature, the operational equation and the authentication method.

The D-I/F 31 on the reception side transmits the command for decrement authentication to the STB 20 that is the source 3 in the same manner as described above.

The D-I/F 21 on the transmission side outputs an command for decrement authentication to the authentication means 23 on the transmission side when receiving the command.

Then, the authentication means 23 on the transmission side utilizes an rule for decrement authentication on the transmission side selected by the authentication selection means 28 on the transmission side while the authentication means 34 on the reception side utilizes an rule for decrement authentication on the reception side selected by the authentication selection means 35 on the reception side so as to carry out decrement authentication.

Then, when the decrement authentication is successful, the authentication means 23 on the transmission side makes a notification that the decrement authentication is successful to the count adjustment and determination means 26.

The count adjustment and determination means 26 deletes the device ID of the sink 1 (5) stored in the device information storage means 27. Then, it indicates that the authentication number counted by the authentication number counting means 24 is decreased by one. Responding to this, the authentication number counting means 24 decreases the counted authentication number by one.

On the other hand, when the decrement authentication is successful in the TV 30, the authentication means 34 on the reception side makes a notification that the decrement authentication is successful to the decoding means 32.

The decoding means 32 deletes the key that decodes the AV data transmitted from the STB 20 in accordance with the notification from the authentication means 34 on the reception side.

As a result of the decrement authentication, the count number counted by the authentication number counting means 24 becomes two, which is smaller than three that is the upper limit number. In addition, the device ID of the sink 1 (5) is deleted and the two device IDs of the sink 0 (4) and the sink (3) are stored in the device information storage means 27.

That is to say, as shown in FIG. 4, in the case that the sink 1 (5) requests decrement authentication and the decrement authentication is successful, the authentication number counted by the authentication number counting means 24 is decreased by one so as to become two so that the device ID of the sink 1 (5) is deleted from the device IDs stored in the device information storage means 27 and only the device IDs of the sink 0 (4) and the sink 3 (7) are stored.

Here, decrement authentication is carried out at the time when the sink 2 (bridge unit) (6) stops the utilization of data requiring copyright protection and, in this case, as described in the fifth embodiment, the sink 2 (bridge unit) (6) carries out decrement authentication for the source 3 according to a plurality of number and in the case that all the apparatuses such as the sink 5 (9) connected to IEEE 1394 bus #2 (2) stop decoding and displaying data requiring copyright protection, the registration of the device ID of the sink 2 (bridge unit) (6) stored in the device information storage means 27 is deleted. That is to say, stoppage of the utilization of data requiring copyright protection from the source 3 by the sink 2 (bridge unit) (6) indicates that all the apparatuses, such as the sink 5 (9) connected to the IEEE 1394 bus #2 (2), have stopped the utilization of the data.

In the case that the sink 4 (8), or the like, carries out an authentication request at this point in time, the authentication is successful in the case of an authorized apparatus since the authentication number counted by the authentication number counting means 24 is smaller than the upper limit number.

That is to say, as shown in FIG. 4, when the sink 4 (8) carries out an authentication request, authentication is successfully carried out. Then, as a result, the authentication number counted by the authentication number counting means 24 becomes three and the device IDs of the sink 0 (4), the sink 3 (7) and the sink 4 (8) are stored in the device information storage means 27.

Thus, the apparatus that has already successfully carried out authentication requests decrement authentication at the time when stopping the utilization of AV data and the STB 20 carries out decrement authentication when receiving a command for decrement authentication so that when this is successful, the device information storage means 27 deletes the device ID of the apparatus that has requested decrement authentication and the authentication number counting means 24 decreases the counted authentication number by one and, therefore, another apparatus can be allowed to newly utilize AV data while maintaining the limitation on the number of apparatuses that can simultaneously utilize AV data. In addition, since an command for decrement authentication is separately provided from an authentication command, an unauthorized apparatus can be prevented from misusing the decrement authentication.

In addition, in the case wherein any of the apparatuses are removed from IEEE 1394 bus #1 (1) or in the case that an apparatus is newly connected to IEEE 1394 bus #1 (1), a bus reset is carried out. Thus, when a bus reset occurs, a authentication number counted by the authentication number counting means 24 is initialized to zero and, in addition, the device IDs stored by the device information storage means 27 are all deleted. Then, the decoding means 32 of the TV 30 discards the key for decoding the utilized AV data. In the case that a bus reset has occurred in such a manner, the operation is repeated from the initial condition.

Here, though in the present embodiment, an authentication command and a command for decrement authentication are described as being different in the signature, the optimal equation and the authentication method, the invention is not limited to this. The authentication command and the command for decrement authentication may differ at least any one, or more, of the signature, the optimal equation and the authentication method.

Furthermore, though in the present embodiment a case is described wherein the number of apparatuses connected to IEEE 1394 bus #1 (1) is six, the invention is not limited to this but, rather, an arbitrary number, of 63 or less, such as three, 10 or 63, of apparatuses may be connected.

Furthermore, though in the present embodiment after a successful authentication is carried out on an apparatus such as the sink 1 (5), other than the bridge unit, the source 3 carries out authentication again on an apparatus such as the sink 1 (5) that has undergone a successful authentication before the authentication is reset due to a predetermined cause and even if the authentication is successful, the authentication number counting means 24 does not increase the counted authentication number and the source 3 carries out authentication again on the sink 2 (bridge unit) (6) that has undergone a successful authentication after successfully carrying out authentication for the sink 2 (bridge unit) (6), etc. before the authentication is reset due to a predetermined cause and in the case that the authentication is successful, the authentication number counting means 24 is described as increasing the counted authentication number, the invention is not limited to this. After authentication is successfully carried out on an apparatus such as the sink 1 (5), other than the bridge unit, the source rejects the authentication request when the source 3 again receives an authentication request from the apparatus, such as the sink 1 (5), that has successfully carried out authentication before the authentication is reset due to a predetermined cause. Here, in the case that the source 3 again receives an authentication request from the sink 2 (bridge unit) (6) after authentication is successfully carried out on the sink 2 (bridge unit) (6) and before the authentication is reset due to a predetermined cause, the source 3 receives this authentication request. Then, in the case that the source 3 successfully carries out authentication again on the sink 2 (bridge unit) (6), the authentication number counting means 24 may increase the counted authentication number.

Second Embodiment

Next, the second embodiment is described.

A copyright protection system of the present embodiment is shown in FIG. 1 in the same manner as of the first embodiment.

Figure 5:
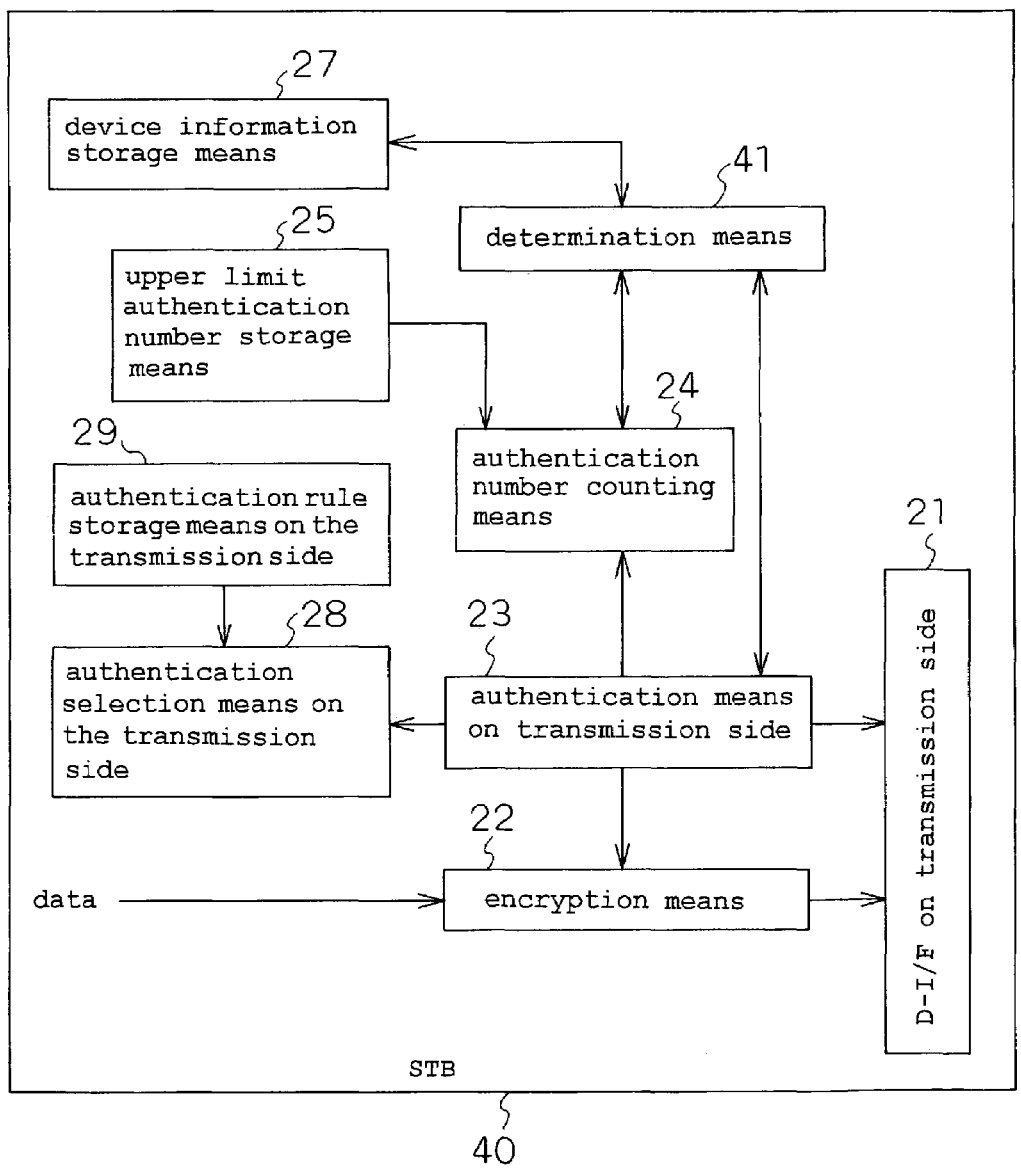
FIG. 5 is a diagram showing the configuration of an STB 40 according to the second, seventh and eighth embodiments of the present invention.

FIG. 5 shows a source 3 of the present embodiment as an STB 40. The difference from the STB 20 of the first embodiment is the point that the STB 40 is provided with a determination means 41 instead of the count adjustment and determination means 26.

The determination means 41 differs from the count adjustment and determination means 26 described in the first embodiment and does not carry out a determination of whether or not an authentication request is a repeated authentication.

In addition, a sink 0 (4), a sink 1 (5), and the like, do not arbitrarily carry out an authentication request again, unlike in the first embodiment. That is to say, the apparatuses, such as the sink 0 (4) and the sink 1 (5), connected to IEEE 1394 bus #1 (1) do not carry out a repeated authentication request until the source 3 updates the key or a bus reset occurs at IEEE 1394 bus #1 (1). The parts other than the above are the same as of the first embodiment.

Here, the source 3 of the present embodiment, that is to say, the STB 40, is an example of a transmission unit of the present invention and the upper limit authentication number storage means 25, the authentication number counting means 24 and the determination means 41 of the present embodiment are examples of authentication number counting means of the present invention.

Next, the operation of the present embodiment having such a configuration is described focusing on the difference from the first embodiment.

The upper limit authentication number storage means 25 of the STB 40 as the source 3 is assumed to store 3 in the same manner as in the first embodiment. That is to say, the AV data requiring copyright protection transmitted by the STB 40 can be displayed on a monitor so as to be viewed and listened to by means of a maximum of three apparatuses at the same time.

In the case that an authentication request from any apparatus, such as the sink 1 (5), has not yet been received, the authentication number counted by the authentication number counting means 24 of the STB 40 as the source 3 is zero and the device information storage means 27 does not store the device ID of any apparatus as shown in FIG. 6.

Here, when the sink 1 (5) carries out an authentication request, authentication is successfully carried out in the same manner as in the first embodiment. As a result, as shown in FIG. 6, the authentication number counted by the authentication number counting means 24 becomes one and the device information storage means 27 stores the device ID of the sink 1 (5).

Furthermore, when the sink 0 (4) carries out an authentication request, authentication is successfully carried out in the same manner as in the first embodiment. As a result, as shown in FIG. 6, the authentication number counted by the authentication number counting means 24 becomes two and the device information storage means 27 stores the device IDs of the sink 1 (5) and of the sink 0 (4).

Furthermore, when the sink 3 (7) carries out an authentication request, authentication is successfully carried out in the same manner as in the first embodiment. As a result, as shown in FIG. 6, the authentication number becomes three and the stored device IDs become of the sink 1 (5), of the sink 0 (4) and of the sink 3 (7).

Furthermore, when the sink 4 (8) carries out an authentication request, the upper limit number stored by the upper limit authentication number storage means 25 and the authentication number counted by the authentication number counting means 24 are equal, so that the authentication request is rejected in the same manner as in the first embodiment. As a result, the authentication number stays at three as shown in FIG. 6 and the stored device IDs, of the sink 1 (5), the sink 0 (4) and the sink 3 (7) do not change.

Next, though in the first embodiment the sink 0 (4) carried out an authentication request again, the authentication request means 33 of the TV 30 as the sink 1 (5) of the present embodiment does not arbitrarily carry out an authentication request again. That is to say, a repeated authentication request is not carried out until the STB 40 updates the key or a bus reset occurs in IEEE 1394 bus #1 (1) and, thereby, the authentication is reset.

Accordingly, in the case that an authentication request is carried out, the determination means 41 does not carry out a determination of whether or not the authentication request is carried out by the same apparatus.

Afterwards, the sink 1 (5) requests decrement authentication and, after that, the sink 4 (8) carries out an authentication request, wherein the operation thereof is the same as in the first embodiment, as shown in FIG. 16, of which the descriptions are omitted.

Here, a bridge unit such as the sink 2 (bridge unit) (6) can carries out an authentication request again on the source 3 by the time when the STB 40 updates the key or a bus reset is carried out in IEEE 1394 bus #1 (1) and, thereby, authentication is reset. Then, in the case that an authentication request is again carried out by the sink 2 (bridge unit) (6) and the authentication is successfully carried out, the authentication number counting means 24 increases the counted authentication number.

Moreover, the STB 40 updates the key for encrypting the AV data to another key whenever a predetermined time elapses. At this time, authentication is reset. That is to say, AV data is encrypted using another key instead of the key that has encrypted the AV data until now.

In addition, the STB 40 initializes the authentication number counted by the authentication number counting means 24 to zero and deletes the device ID stored in the device information storage means 27 in the case that the update to another key is carried out as described above.

That is to say, the STB 40 returns to the same condition as the initial condition wherein authentication is not carried out on any apparatus.

Then, when the STB 40 updates the key, the decoding means 32 of the TV 30 can not decode AV data using the key that has been used until now.

Therefore, the authentication request means 33 of the TV 30 carries out an authentication request again after confirming that the STB 40 has updated the key.

Furthermore, in the case that the STB 40 and the TV 30 have successfully carried out authentication, the authentication means 23 on the transmission side passes, to the authentication means 34 on the reception side, the key that becomes effective after the update of the key carried out following this update of the key, too.

Accordingly, even when an authentication request is carried out after the STB 40 updates the key, the decoding means 32 has already gained the key that becomes effective at the time when the STB 40 exchanges the keys and, therefore, decoding of the AV data can be sequentially carried out.

In addition, in the case that a bus reset occurs in IEEE 1394 bus #1 (1) authentication is reset. That is to say, the authentication number counted by the authentication number counting means 24 is initialized to zero and the device ID stored in the device information storage means 27 is deleted.

That is to say, the STB 40 returns to the same condition as the initial condition wherein authentication is not carried out on any apparatus. In this case also, the authentication request means 33 of the TV 30 carries out an authentication request again after confirming that the STB 40 has updated the key in the same manner as in the above.

Thus, an apparatus, such as the sink 1 (5), is made not to arbitrarily carry out an authentication request again and, thereby, the number of apparatuses that can display AV data requiring copyright protection on a monitor can be limited in the same manner as in the first embodiment.

Third Embodiment

Next, the third embodiment is described.

A copyright protection system of the present embodiment is shown in FIG. 1 in the same manner as in the first embodiment.

Figure 7:
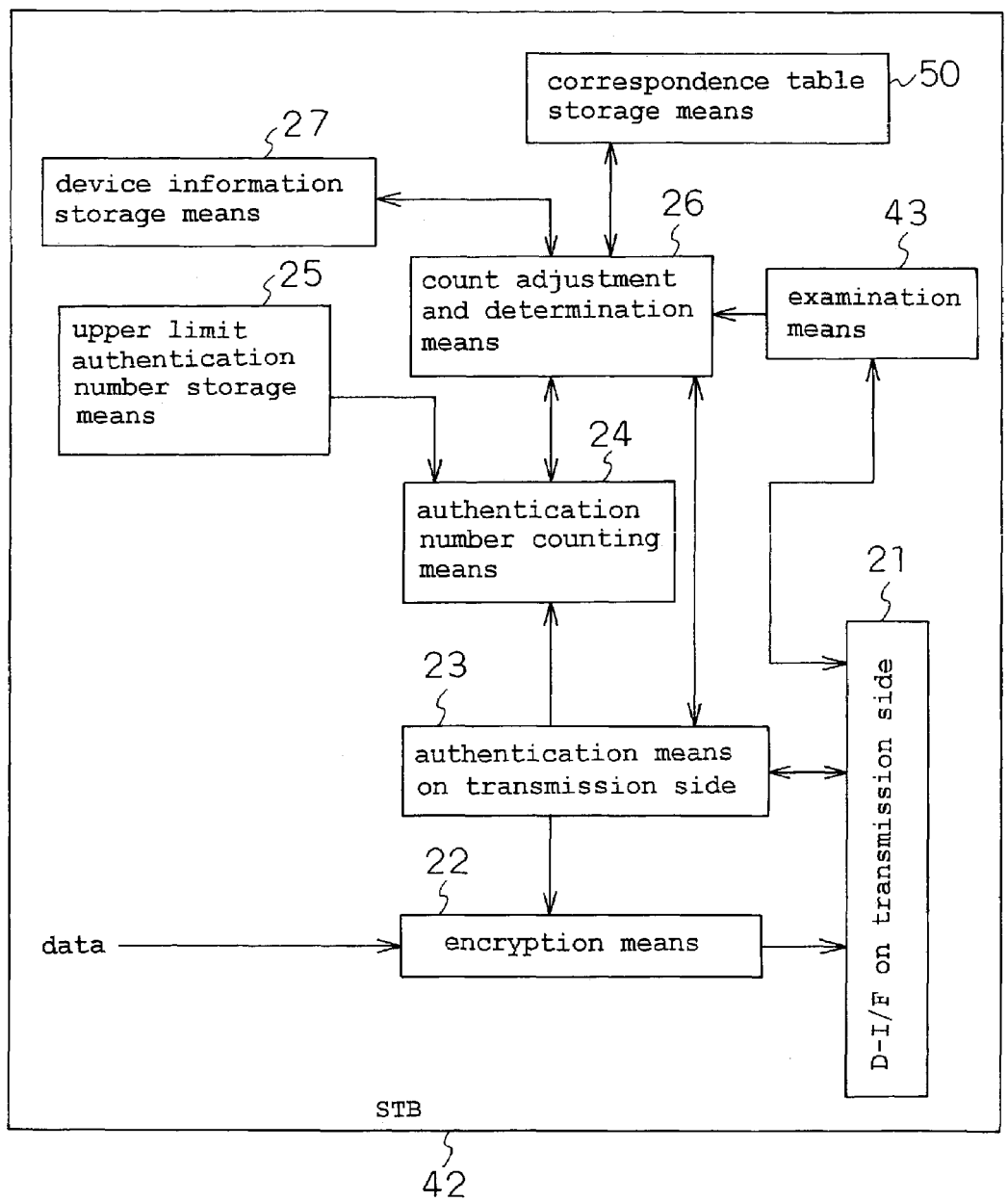
FIG. 7 is a diagram showing the configuration of an STB according to the third embodiment of the present invention.

FIG. 7 shows a source 3 of the present embodiment as an STB 42. The STB 42 of the present embodiment does not, unlike the STB 20 of the first embodiment, carry out decrement authentication but, instead, the STB 42 periodically examines whether or not the sink 1 (5), or the like, has stopped decoding AV data or displaying the AV data on a monitor. That is to say, the STB 42 of the present embodiment is provided with an examination means 43 and a correspondence table storage means 50 unlike the STB 20 of the first embodiment and, in addition, is not provided with an authentication rule storage means 29 nor an authentication selection means 28 on the transmission side.

The examination means 43 is a means of periodically examining whether or not the sink 1 (5), or the like, has stopped decoding AV data or displaying AV data on a monitor.

The correspondence table storage means 50 is a means of storing a correspondence table wherein the node unique ID that is information for exclusively specifying an apparatus in the IEEE 1394 standard and the device ID that is information exclusively specifying an apparatus, which is allocated as a portion of the signature from the key management center, are made to correspond to each other.

Figure 8:
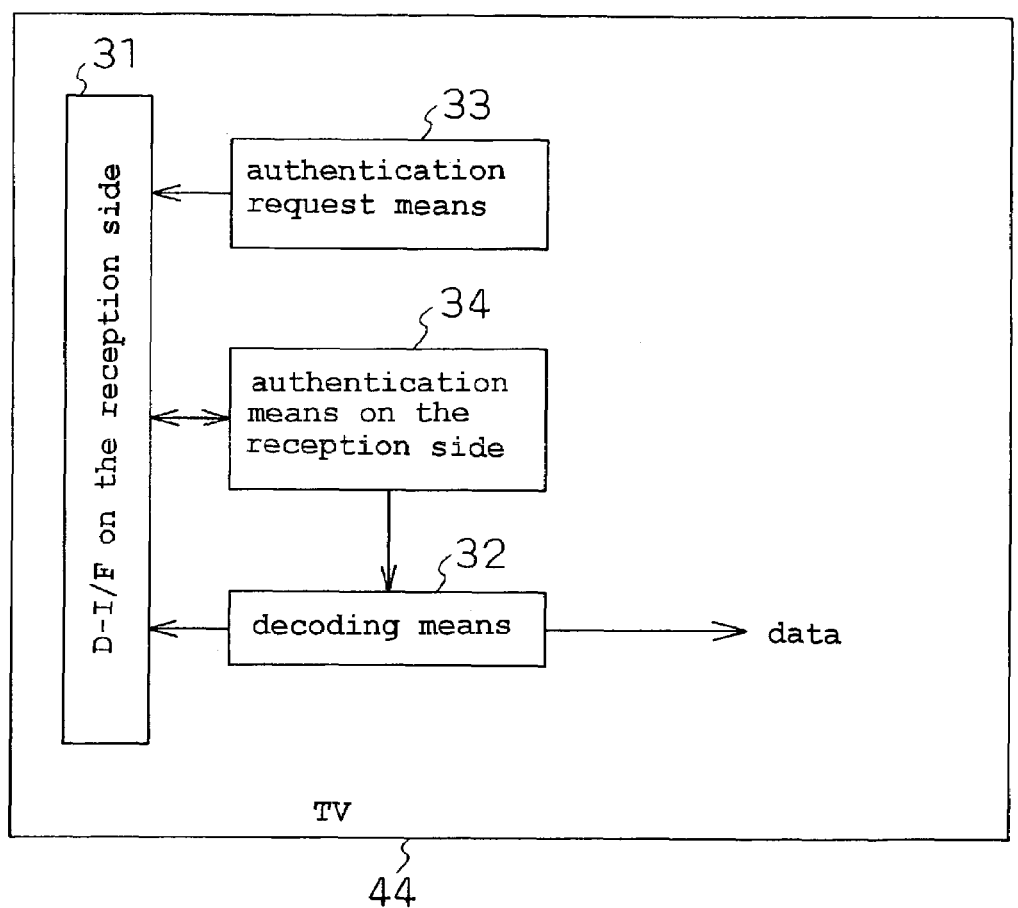
FIG. 8 is a diagram showing the configuration of a TV according to the third and fourth embodiments of the present invention.

In addition, FIG. 8 shows the sink 1 (5), or the like, of the present embodiment as TV 44.

The TV 44 of the present embodiment does not request decrement authentication, unlike the TV 30 of the first embodiment, in the case that decoding and display on a monitor of AV data are stopped. That is to say, the TV 44 is not provided with the authentication rule storage means 36 on the reception side nor the authentication selection means 35 on the reception side.

The parts other than the above are the same as in the first embodiment.

Here, the source 3 of the present embodiment, that is to say, the STB 42, is an example of a transmission unit of the present invention, the sink 1 (5) of the present embodiment, that is to say, the TV 44, is an example of a reception unit of the present invention and the examination means 43, the count adjustment and determination means 26 of the present embodiment, the correspondence table storage means 50 and the device information storage means 27 are examples of examination means of the present invention.

Next, the operation of the present embodiment having such a configuration is described focusing on the difference from the first embodiment.

As shown in FIG. 4, a sink 1 (5), a sink 0 (4), a sink 3 (7) and sink 0 (4) carry out an authentication request in the order of this in the same manner as in the first embodiment and, as a result, the authentication number counted by the authentication number counting means 24 as the source 3 is assumed to be three while the device information storage means 27 is assumed to store the device IDs of the sink 1 (5), the sink 0 (4) and the sink 3 (7). Here, the STB 42 is not provided with the authentication selection means 28 on the transmission side nor the authentication rule storage means 29 on the transmission side and, therefore, the STB 42 does not select an authentication rule at the time when authentication is carried out on the TV 44. The TV 44 does not select an authentication rule in the same manner.

The TV 44 as the sink 1 (5) displays the image and sound of the AV data transmitted from the STB 42 as the source 3 on a monitor.

The examination means 43 periodically examines the conditions of plugs of every apparatus, such as the sink 0 (4) or the sink 1 (5), connected to IEEE 1394 bus #1 (1).

Here, the plugs are standardized according to IEC 61883, which is the standard for transmitting data of AV apparatuses using the IEEE 1394 bus and for carrying out apparatus control, and are used conceptually for managing logical connections among apparatuses connected to IEEE 1394 buses. In the following, the plugs are briefly described.

There are two types of plugs, input plugs and output plugs. That is to say, in the case that an apparatus has a function of inputting AV data from IEEE 1394 bus, the apparatus has input plugs according to the same number as the number of pieces of AV data that can be imputed at the same time, that is to say, the same number of isochronous channels that can be inputted at the same time while in the case that an apparatus has a function of outputting AV data to IEEE 1394 bus, the apparatus has output plugs according to the same number as the pieces of AV data that can be outputted at the same time, that is to say, the same number of isochronous channels that can be outputted at the same time.

Then, each apparatus has one iPCR (input plug control register) for maintaining the condition of an input plug corresponding to one input plug. In addition, each apparatus has one oPCR (output plug control register) for maintaining the condition of an output plug corresponding to one output plug.

In the case that apparatuses connected to IEEE 1394 bus carry out transmission and reception of AV data to and from each other, it is necessary for these apparatuses to establish a connection between them. That is to say, a connection is established by setting information necessary for iPCR and oPCR, such as a type of connection (broadcast connection or point to point connection), the number of connections and a utilized channel number, in the oPCR of the apparatus on the transmission side and in the iPCR of the apparatus on the receiving side. In addition, at the time when an apparatus connected to IEEE 1394 bus stops receiving AV data and decoding for display, it is necessary to cut off the above described connection. At this time, by subtracting the number of connections set in iPCR or in oPCR, or by canceling the types of registered connections, the connection is cut off. Accordingly, by examining the conditions that are set in the iPCR, it can be known whether the apparatus receives AV data to be decoded and displayed or whether decoding and display of AV data are stopped. The plugs are described in the above.

Here, the sink 1 (5) is assumed to stop receiving the AV data transmitted from the source 3 and decoding for the display. Then, the setting of the connection of the iPCR that corresponds to the AV data is released.

The examination means 43 found that the sink 1 (5) has cut off the connection with the source 3 as a result of examining the condition of the iPCR of the sink 1 (5).

Then, the examination means 43 acquires the node unique ID of the sink 1 (5) and makes a notification that the node unique ID of the sink 1 (5) and the sink 1 (5) have cut off the connection with the STB 42, as the source 3, to the count adjustment and determination means 26.

The count adjustment and determination means 26 examines the device ID of the sink 1 (5) that corresponds to the node unique ID from the received node unique ID by utilizing the correspondence table stored in the correspondence table storage means 50 when receiving a notification from the examination means 43.

As described above, the authentication number counted by the authentication number counting means 24, as the source 3, is three as shown in FIG. 4 and the device information storage means 27 stores the device IDs of the sink 1 (5) the sink 0 (4) and the sink 3 (7).

Accordingly, the count adjustment and determination means 26 directs that, since the device ID of the sink 1 (5) has already been stored in the device information storage means 27, the device ID of the sink 1 (5) is deleted from the device information storage means 27 and the authentication number counted by the authentication number counting means 24 is decreased by one. In response to this, the authentication number counting means 24 decreases the counted authentication number by one.

Thus, unlike the first embodiment, the examination means 43 of the STB 42 that is the source 3 examines the apparatus that has stopped receiving the AV data transmitted from the source 3 and decoding for the display and, thereby, the same effects as of the first embodiment can be gained without carrying out decrement authentication.

Here, though in the present embodiment the examination means 43 is described as examining whether or not the sink 1 (5), or the like, has stopped receiving AV data and decoding for the display by examining the condition of the plug of the sink 1 (5), or the like, the invention is limited to this. The invention may have the structure as described below.

That is to say, the examination means 43 checks the number of apparatuses connected to IEEE 1394 bus #1 (1) before checking the condition of the plug of each apparatus, and only when the number of these apparatuses has decreased, the examination means 43 checks which apparatus is removed from the IEEE 1394 bus #1 (1) so as to acquire the node unique ID of the apparatus removed from IEEE 1394 bus #1 (1) and, then, makes a notification to the count adjustment and determination means 26 of the node unique ID of the apparatus and that the apparatus is removed. Then, the count adjustment and determination means 26 finds the device ID that corresponds to the notified node unique ID from the correspondence table. Then, the count adjustment and determination means 26 checks whether or not the found device ID has already been registered with the device information storage means 27. In the case that it is registered, the STB 42 and the apparatus on which authentication has been carried out are removed and, therefore, the count adjustment and determination means 26 directs the authentication number counting means 24 to decrease the counted authentication number. In response to this direction, the authentication number counting means 24 decreases the counted authentication number. Furthermore, the count adjustment and determination means 26 deletes the device ID of the removed apparatus that is stored in the device information storage means 27.

Note that the removal from IEEE 1394 bus #1 (1) as described hereinbefore does not indicate that the connector connected to IEEE 1394 bus #1 (1) is removed from IEEE 1394 bus #1 (1) but, rather, it indicates that the TV 44 receives data sent from a system different from the D-I/F 31 on the reception side so as to allow display on a monitor.

Fourth Embodiment

Next, the fourth embodiment is described.

A copyright protection system of the present embodiment is shown in FIG. 1 in the same manner as in the first embodiment.

Figure 9:
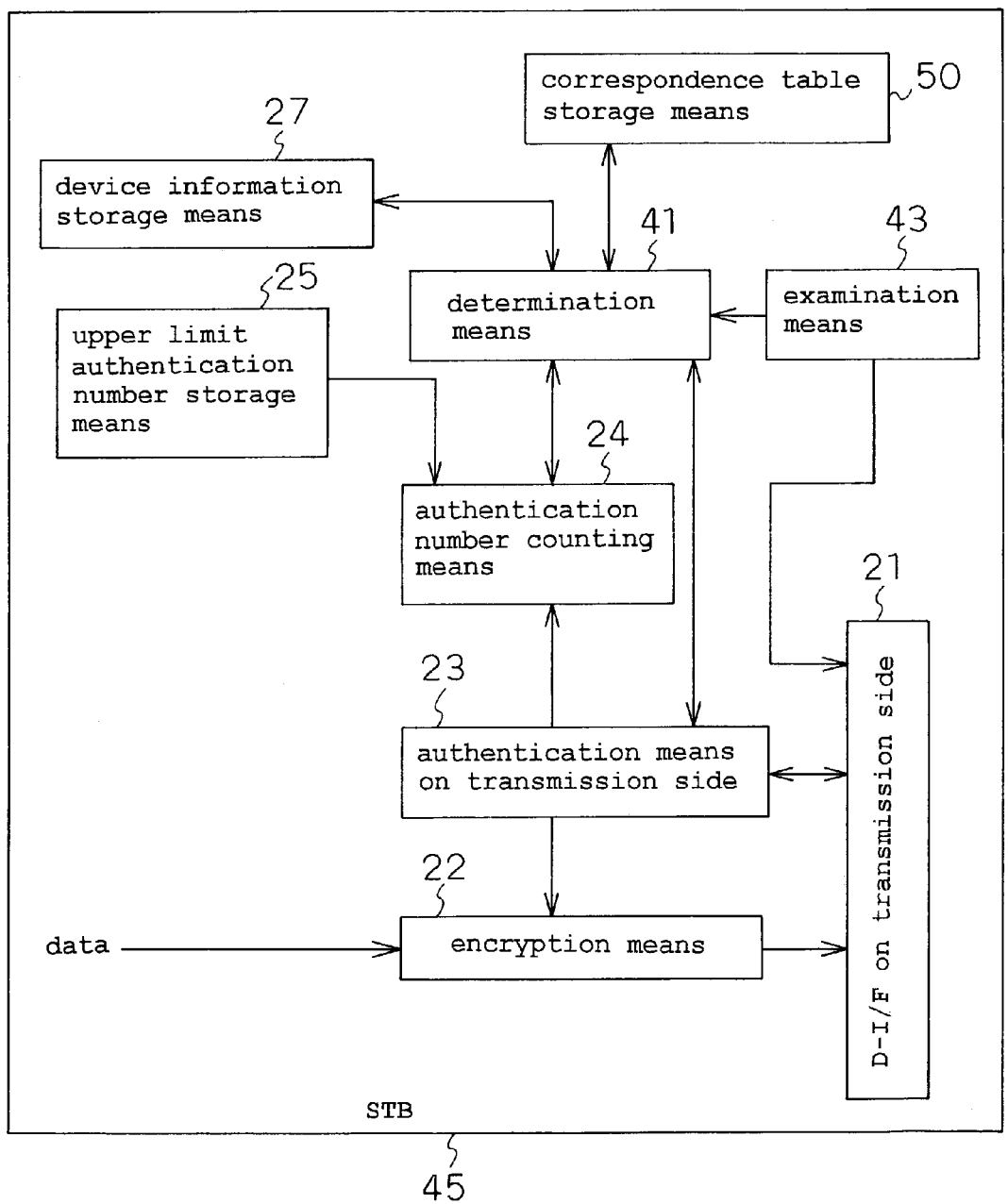
FIG. 9 is a diagram showing the configuration of an STB according to the fourth embodiment of the present invention.

FIG. 9 shows a source 3 of the present embodiment as an STB 45. The STB 45 of the present embodiment does not carry out decrement authentication, unlike the STB 40 of the second embodiment but, instead, periodically examines whether or not the sink 1 (5), or the like, has stopped the decoding and the displaying on a monitor of AV data. That is to say, the STB 45 of the present embodiment is, unlike the STB 40 of the second embodiment, provided with an examination means 43 and a correspondence table storage means 50 and, in addition, is not provided with an authentication rule storage means 29 nor with an authentication selection means 28 on the transmission side.

The examination means 43 is a means of periodically examining whether or not the sink 1 (5), or the like, has stopped the decoding and the displaying on a monitor of AV data.

The correspondence table storage means 50 is a means of storing a correspondence table that makes the node unique ID, which is information for exclusively specifying an apparatus in the IEEE 1394 standard, and the device ID, which is information for exclusively specifying a device allocated from the key management center, correspond to each other.

In addition, FIG. 8 shows the sink 1 (5), and the like, of the present embodiment as the TV 44. The TV 44 is the same as in the third embodiment.

That is to say, the TV 44 of the present embodiment does not, unlike the TV 30 of the first embodiment, request decrement authentication in the case that the decoding and the displaying on a monitor of AV data are stopped.

The parts, other than the above, are the same as in the second embodiment.

Here, the source 3 of the present embodiment, that is to say the STB 45, is an example of a transmission unit of the present invention and the correspondence table storage means 50, the determination means 41, the examination means 43 and the device information storage means 27 are examples of the examination means of the present invention.

Next, the operation of the present embodiment having such a configuration is described focusing on the differences from the second embodiment.

As shown in FIG. 6, authentication requests are carried out on the sink 1 (5), the sink 0 (4), the sink 3 (7) and the sink 4 (8), in this order, in the same manner as in the second embodiment and, as a result, the authentication number counted by the authentication number counting means 24 as the source 3 is three and the device information storage means 27 is assumed to store the device IDs of the sink 1 (5), the sink 0 (4) and the sink 3 (7). Here, the STB 45 is not provided with the authentication selection means 28 on the transmission side nor the authentication rule storage means 29 on the transmission side and, therefore, the selection of an authentication rule is not carried out at the time when authentication is carried out on the TV 44.

The TV 44, as the sink 1 (5), displays the image and sound of the AV data transmitted from the STB 45, as the source 3, on a monitor.

The examination means 43 periodically examines the conditions of a plug of every apparatus, such as the sink 0 (4) or the sink 1 (5), connected to IEEE 1394 bus #1 (1)

Here, the sink 1 (5) is assumed to stop the reception and decoding for display of AV data transmitted from the source 3. Then, the setting of the connection of the iPCR, which corresponds to the above AV data, is released.

It is assumed that the examination means 43 finds that the sink 1 (5) has cut off the connection with the source 3 as a result of examining the condition of the iPCR of the sink 1 (5).

Then, the examination means 43 acquires the node unique ID of the sink 1 (5) and makes a notification to the count adjustment and determination means 26 of the node unique ID of the sink 1 (5) and that the sink 1 (5) has cut off the connection with the STB 45, as the source 3.

The operation hereinafter is the same as in the third embodiment and, accordingly, the count adjustment and determination means 26 deletes the device ID of the sink 1 (5) from the device information storage means 27 and directs the authentication number counting means 24 to decrease the authentication number counted by the authentication number counting means 24 by one since the device ID of the sink 1 (5) has already been stored in the device information storage means 27. In response to this, the authentication number counting means 24 decreases the counted authentication number by one.

Thus, unlike in the second embodiment, the examination means 43 of the STB 42, which is the source 3, examines the apparatus that has stopped the reception and decoding for display of the AV data transmitted from the source 3 and, thereby, the same effects as of the second embodiment can be gained without carrying out decrement authentication.

Fifth Embodiment

Next, the fifth embodiment is described.

FIG. 1 shows a copyright protection system of the present embodiment.

FIG. 5 shows a source 3 of the present embodiment as an STB 40. The STB 40 of the present embodiment is the same as is described in Embodiment 2.

FIG. 3 shows a sink 1 (5) connected to IEEE 1394 bus #1 (1), a sink 5 (9) connected to IEEE 1394 bus #2 (2), and the like, as a TV 30. The TV 30 of the present embodiment is the same as is described in the second embodiment.

Figure 10:
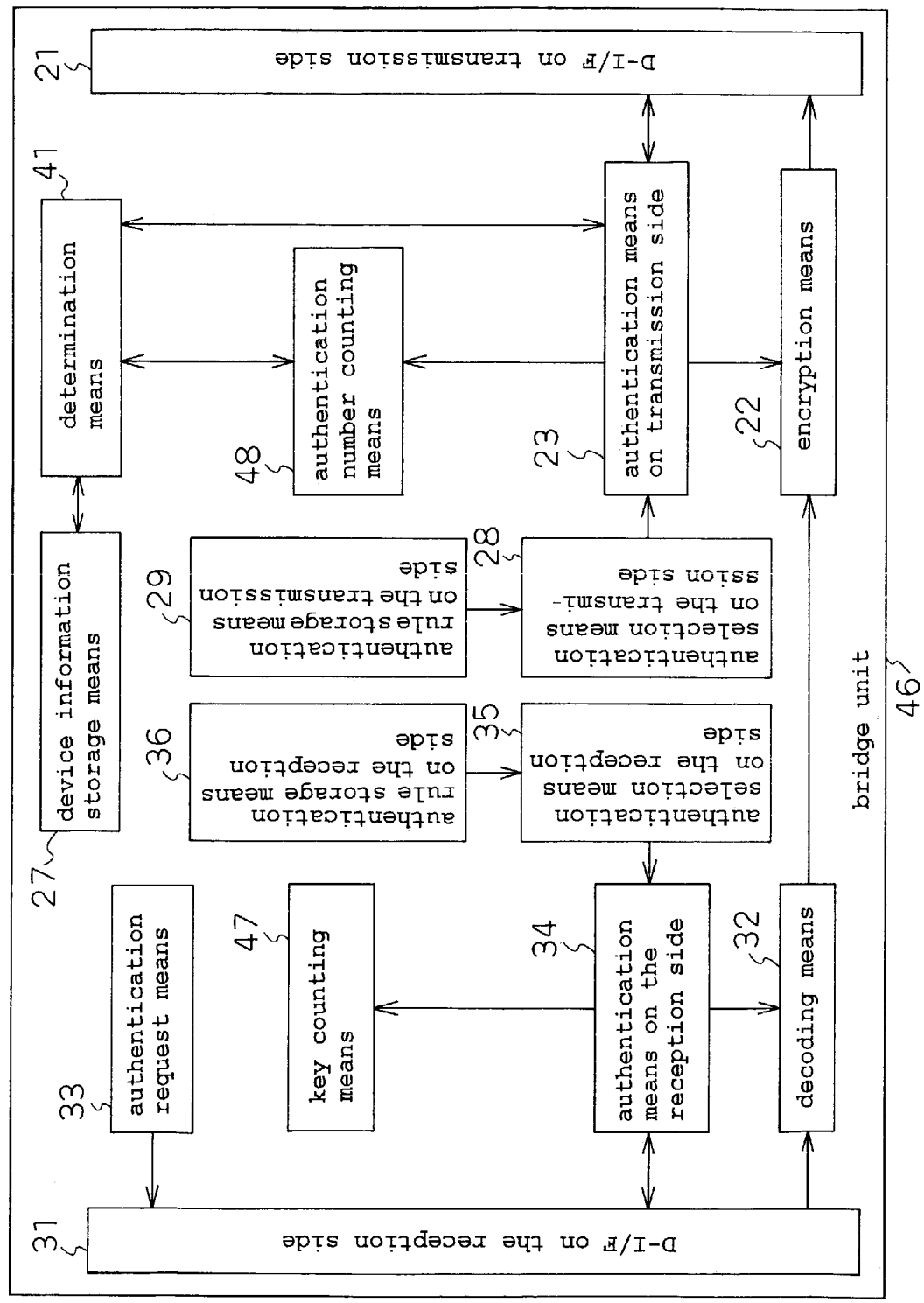
FIG. 10 is a diagram showing the configuration of a bridge unit according to the fifth embodiment of the present invention.

FIG. 10 shows a sink 2 (bridge unit) (6) as a bridge unit 46.

The bridge unit 46 is a unit that once decodes AV data sent from IEEE 1394 bus #1 (1) as the received isochronous packet, that encrypts the AV data using a key the bridge unit 46 has, that transmits the AV data to IEEE 1394 bus #2 (2) as an isochronous packet and that rewrites the node ID of the transmission origin attached to the header of the isochronous packet received from IEEE 1394 bus #1 (1) at this time into the node ID of its own, which is then transmitted.

The bridge unit 46 is formed of a D-I/F 31 on the reception side, a decoding means 32, an authentication means 34 on the reception side, a key counting means 47, an authentication request means 33, an authentication rule storage means 36 on the reception side, an authentication selection means 35 on the reception side, a D-I/F 21 on the transmission side, an encryption means 22, an authentication means 23 on the transmission side, an authentication number counting means 48, a determination means 41, a device information storage means 27, an authentication rule storage means 29 on the transmission side and an authentication selection means 28 on the transmission side.

The key counting means 47 is a means of counting the key count number that is the number of successful authentications carried out on apparatuses such as the source 3 that transmits AV data to IEEE 1394 bus #1 (1).

The authentication number counting means 48 is a means of counting the authentication number that is the number of the successful authentications carried out on the apparatuses such as the sink 5 (9) connected to IEEE 1394 bus #2 (2).

The other parts of the configuration are the same as of the second embodiment, of which the descriptions are omitted.

Here, the bridge unit 46 of the present embodiment is an example of a bridge unit of the present invention, the authentication rule storage means 36 on the reception side, the authentication selection means 35 on the reception side and the authentication means 34 on the reception side are examples of authentication means on the reception side of a bridge unit of the present invention, the authentication rule storage means 29 on the transmission side, the authentication selection means 28 on the transmission side and the authentication means 23 on the transmission side are examples of authentication means on the transmission side of a bridge unit of the present invention, the authentication number counting means 48 of the present embodiment is an example of an authentication number counting means of a bridge unit of the present invention, the authentication number counted by the authentication number counting means 48 of the present embodiment is an example of the authentication number counted by an authentication number counting means of a bridge unit of the present invention and the key count number of the present embodiment is an example of the upper limit number of permissions of the present invention.

Next, the operation of the present embodiment having such a configuration is described.

Figures 1, 11:
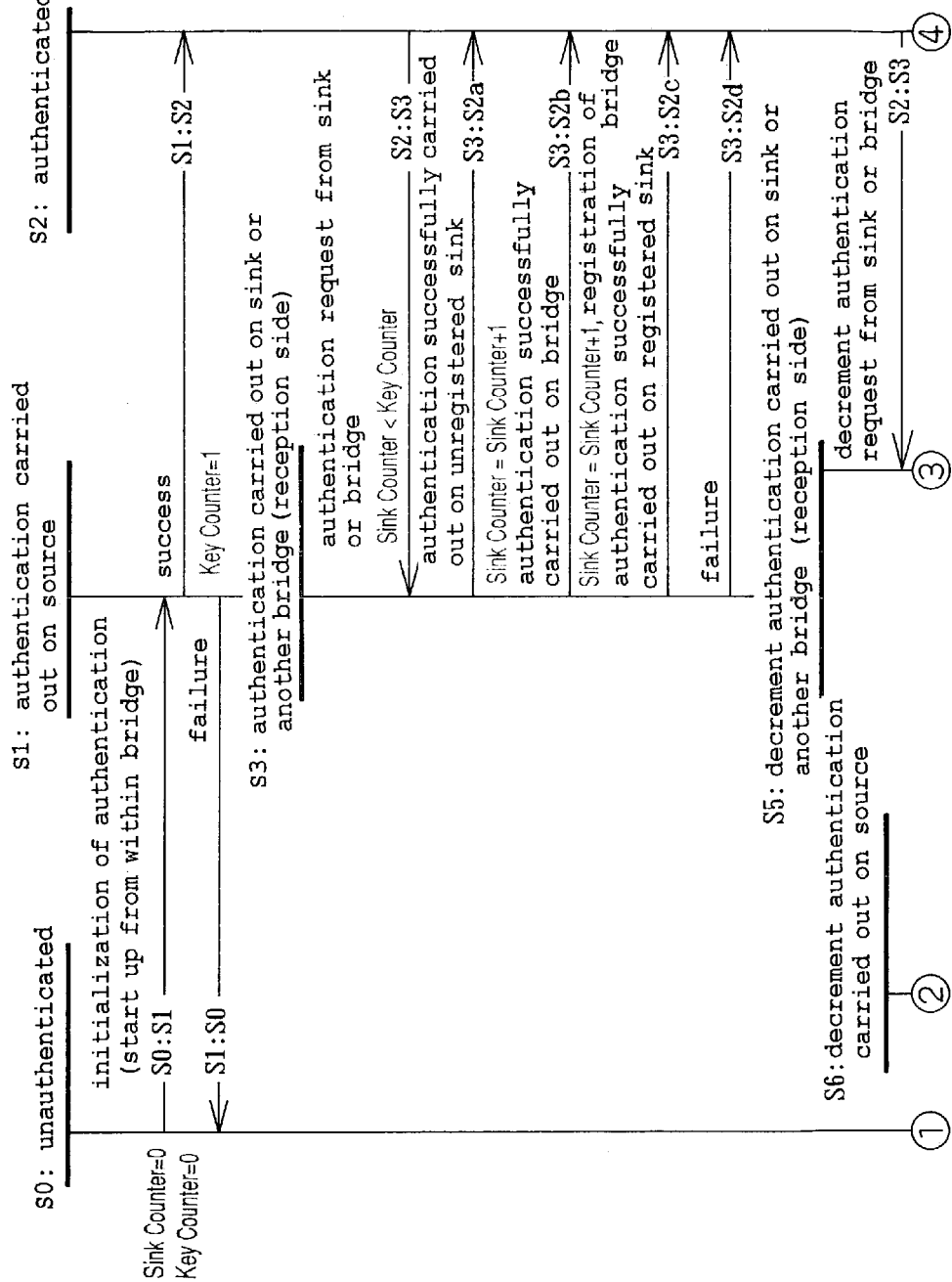
FIG. 11 is a state machine diagram for describing the operation of the bridge unit according to the fifth embodiment of the present invention.
Figures 2, 11:
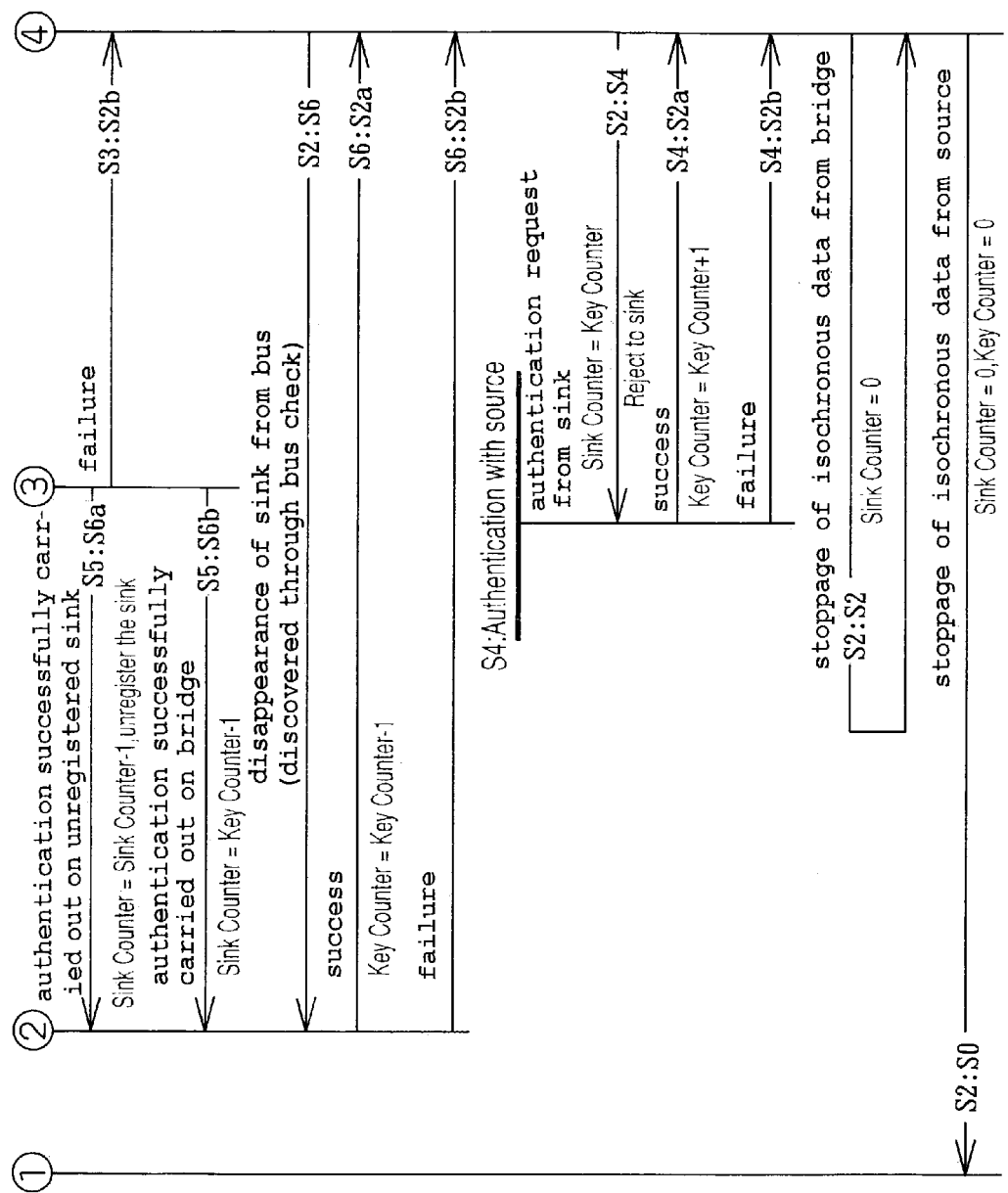
Figure 12:
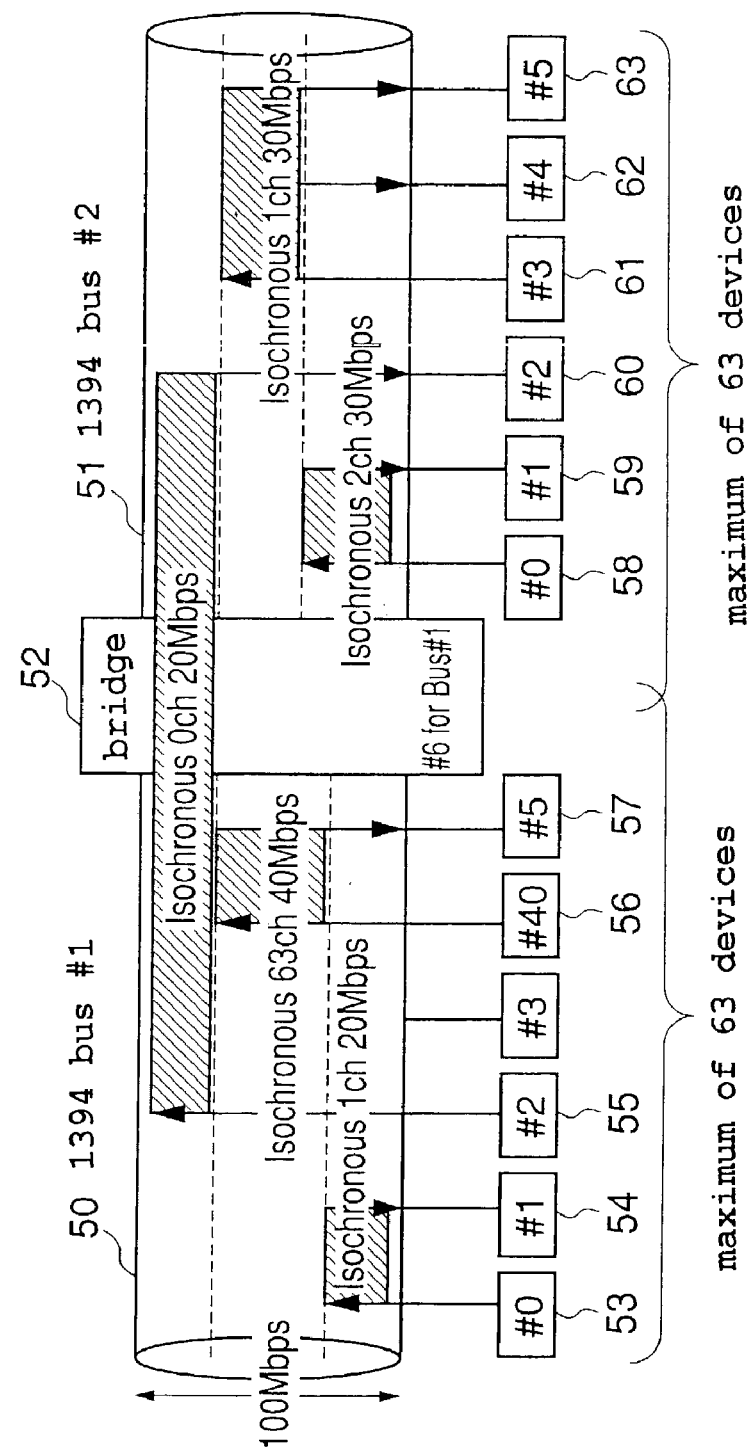
FIG. 12 is a diagram showing the configuration of a bus system according to a prior art.

FIG. 11 shows a state machine diagram showing the operation of the bridge unit 46. In the following, the description is given in reference to this state machine diagram.

The bridge unit 46 functions as a sink that receives the AV data transmitted by the source 3 in IEEE 1394 bus #1 (1) and functions as a source that transmits AV data to the sink 5 (9), or the like, in IEEE 1394 bus #2 (2).

In the case that the power supply of the bridge unit 46 is turned on or the bridge unit 46 is connected to IEEE 1394 bus #1 (1) and to IEEE 1394 bus #2 (2) so that a bus reset of IEEE 1394 bus #2 (2) occurs, or in the case that an apparatus is connected to or removed from IEEE 1394 bus #1 (1), so that a bus reset occurs in IEEE 1394 bus #1 (1), the bridge unit 46 is reset to the unauthenticated condition of (S0). That is to say, the authentication of the bridge unit is reset. The key count number counted by the key counting means 47 of the bridge unit 46 is initialized to zero and the authentication number counted by the authentication number counting means 48 of the bridge unit 46 is initialized to zero, respectively, under the unauthenticated condition (S0).

During the transition from the unauthenticated condition (S0) to the authentication (S1) carried out on the source, initialization of authentication is carried out. That is to say, the authentication request means 33 of the bridge unit 46 prepares an authentication command that is the command for carrying out an authentication request and outputs the authentication command to the D-I/F 31 on the reception side. The D-I/F 31 on the reception side transmits the authentication command to the source 3 of IEEE 1394 bus #1 (1).

Under the condition of the authentication (S1) carried out on the source, the STB 40 as the source 3 shown in FIG. 5 determines whether the authentication command is accepted or rejected when receiving the authentication command from the bridge unit 46 in the same manner as in the second embodiment. Then, in the case that the STB 40 rejects the authentication command from the bridge unit 46, or in the case that the authentication command from the bridge unit 46 is accepted but authentication has failed, the condition wherein the authentication (S1) is carried out on the source makes a transition to the unauthenticated condition (S0).

In addition, in the case that the STB 40 accepts the authentication command from the bridge unit 46 and the authentication means 23 on the transmission side of the STB 40 and the authentication means 34 on the reception side of the bridge unit 46 successfully carry out authentication, the condition wherein the authentication (S1) is carried out on the source makes a transition to the condition of authenticated (S2). At this time, the key counting means 47 of the bridge unit 46 increases the key count number by one, that is to say, sets the counted key count number at 1.

In addition, the determination means 41 of the STB 40 as the source 3 succeeds in authentication and, therefore, directs the authentication number counting means 24 of the STB 40 to increase the counted count number by one so that in response to this, the authentication number counting means 24 of the STB 40 increases the counted authentication number by one. Such an operation of the STB 40 is described in detail in the second embodiment.

Under the condition of authenticated (S2), the bridge unit 46 is in the condition wherein authentication is successfully carried out on the source 3, or the like.

When an authentication request is carried out by an apparatus such as the sink 5 (9) connected to IEEE 1394 #2 (2) under the condition of authenticated (S2), the determination means 41 of the bridge unit 46 determines as follows. That is to say, at present, the authentication number counted by the authentication number counting means 48 of the bridge unit is zero and the key count number counted by the key counting means 47 is one and, therefore, the value of the authentication number is smaller than the value of the key count number. In this case, the determination means 41 of the bridge unit 46 determines that the authentication means 23 on the transmission side of the bridge unit 46 should carry out authentication for the sink 5 (9) corresponding to the authentication command from the sink 5 (9). The authentication means 23 on the transmission side of the bridge unit 46 carries out authentication for the sink 5 (9) in accordance with this determination. That is to say, the authenticated condition (S2) makes a transition to the condition wherein authentication (S3) is carried out on the sink or on another bridge (reception side). When authentication carried out on the authentication means 23 on the transmission side of the bridge unit 46 and the sink 5 (9) succeeds, the authentication number counting means 48 of the bridge unit 46 increases the counted authentication number by one and the device information storage means 27 stores the device ID of the sink 5 (9). Accordingly, the key count number counted by the key counting means 47 is one and the authentication number counted by the authentication number counting means 48 becomes one. Then, the condition makes a transition to the authenticated condition (S2).

Here, furthermore, suppose the sink 6 (10) transmits an authentication command to the bridge unit 46. In this case, when the authentication means 23 on the transmission side of the bridge unit 46 receives the authentication command from the sink 6 (10), the determination means 41 of the bridge unit 46 determines as follows based on the request from the authentication means 23 on the transmission side. That is to say, at present, the key count number counted by the key counting means 47 is one, the authentication number counted by the authentication number counting means 48 of the bridge unit 46 is also one so that the key count number and the authentication number become equal. In the case that the key count number and the authentication number are equal, the determination means 41 allows the authentication request from the sink 6 (10) to be completed after the retrial and determines that authentication should first be carried out on the source 3. The authentication means 23 on the transmission side follows this determination so as to once reject the authentication request from the sink 6 (10) and complete it. Then, the authentication request means 33 of the bridge unit 46 transmits the authentication command to the source 3. That is to say, the authenticated condition (S2) makes a transition to the condition wherein authentication (S4) is carried out on the source.

Though not described in the second embodiment, the bridge unit 46, as the sink 2 (6) of IEEE 1394 bus #1 (1) carries out an authentication request repeatedly on the source 3 unlike other sink 5 (9), and the like. Then, whenever the STB 40 as the source 3 successfully carries out authentication for the bridge unit 46 the authentication number counting means 24 of the STB 40 increases the counted authentication number in the range that does not exceed the upper limit number of the upper limit authentication number storage means 25. The determination of whether the determination means 41 of the STB 40 accepts or rejects the authentication request is carried out in the completely same manner as in the case of the bridge unit 46, the sink 1 (5), and the like.

In the case that the source 3 and the authentication means 23 on the transmission side of the bridge unit 46 successfully carry out authentication in the same manner as in the second embodiment, the key counting means 47 increases the counted key count number by one. That is to say, the condition wherein authentication (S4) is carried out on the source makes a transition to the authenticated condition (S2). At this point in time, the key count number becomes two and the authentication number becomes one.

When an authentication command is received again from the sink 6 (10) under the condition of authenticated (S2) the determination means 41 of the bridge unit 46 determines that authentication should be carried out on the sink 6 (10)

because the key count number is larger than the authentication number. That is to say, the authenticated condition (S2) makes a transition to the condition wherein authentication (S3) is carried out on the sink or on another bridge (reception side). Then, when the authentication means 23 on the transmission side of the bridge unit 46 successfully carries out authentication for the sink 6 (10) under the condition of authentication (S3) carried out on the sink or another bridge (reception side), the authentication number counting means 48 of the bridge unit 46 increases the counted authentication number by one and the device information storage means 27 stores the device ID of the sink 6 (10). Then, the condition wherein authentication (S3) is carried out on the sink or on another bridge (reception side) makes a transition to the authenticated condition (S2). In this condition, the key count number is two and the authentication number has become two.

When the bridge unit 46 is requested for authentication from an apparatus connected to IEEE 1394 bus #2 (2) in the above manner, the bridge unit 46 makes a transition from the authenticated condition (S2) to the condition wherein authentication (S3) is carried out on the sink or on another bridge (reception side) in the case that the key count number is greater than the authentication number and completes the authentication request from that apparatus after the retrial so as to carry out authentication for the source 3 in the case that the key count number and the authentication number are equal. That is to say, the authenticated condition (S2) makes a transition to the condition wherein authentication (S4) is carried out on the source. That is to say, in the case that the bridge unit 46 is requested for authentication from an apparatus connected to IEEE 1394 bus #2 (2), the values of the key count number and the authentication number are compared and in the case that the key count number is greater than the authentication number, authentication is carried out on the apparatus connected to IEEE 1394 bus #2 (2) while in the case that the key count number and the authentication number are equal, authentication is carried out on the source 3 before authentication is carried out on the apparatus that has carried out an authentication request.

In addition, the source 3 connected to IEEE 1394 bus #1 (1) is an apparatus that controls AV data to be decoded and displayed only on a maximum of three apparatuses as described in the second embodiment. In the case that the bridge unit 46 receives an authentication request from the sink connected to IEEE 1394 bus #2 (2) in the above described manner, the bridge unit carries out authentication for the source connected to IEEE 1394 bus #1 (1) before authentication is carried out on the above apparatus so that authentication is carried out on the sink connected to IEEE 1394 bus #2 (2) after the above authentication is successful and, therefore, the limitation on the number of apparatuses for the AV data requiring copyright protection that is transmitted from the source 3 can be adhered to even in the case the bridge unit 46 exists.

Here, the sink 5 (9) receives and decodes the AV data requiring copyright protection that is transmitted from the source 3 and the sink 5 (9) that stops displaying the AV data on a monitor requests decrement authentication by transmitting a command for decrement authentication to the bridge unit 46 in the same manner as described in the first embodiment. That is to say, the authenticated condition (S2) makes a transition to the condition wherein decrement authentication (S5) is carried out on the sink or on another bridge (reception side). At this point in time, the key count number of the key counting means 47 is two and the authentication number counted by the authentication number counting means 48 of the bridge unit 46 is also two.

Under the condition of decrement authentication (S5) carried out on the sink or another bridge (reception side) the bridge unit 46 carries out decrement authentication for the sink 5 (9) Then, in the case that the decrement authentication is successful, the authentication number counted by the authentication number counting means 48 of the bridge unit 46 is decreased by one and the device information storage means 27 deletes the device ID of the stored sink 5 (9). Then, the condition wherein decrement authentication (S5) is carried out on the sink or on another bridge (reception side) makes a transition to the condition wherein decrement authentication (S6) is carried out on the source. On the other hand, in the case that decrement authentication has failed, the condition wherein the decrement authentication (S5) is carried out on the sink or on another bridge (reception side) makes a transition to the authenticated condition (S2).

The bridge unit 46 carries out decrement authentication for the source 3 in the condition of the decrement authentication (S6) carried out on the source and when it is successful, the key count number is decreased by one and the condition wherein decrement authentication (S6) is carried out on the source makes a transition to the authenticated condition (S2) In addition, in the case that the decrement authentication has failed the key count number is not decreased and the condition wherein decrement authentication (S6) is carried out on the source makes a transition to the authenticated condition (S2). At this point in this time, the key count number becomes one and the authentication number of the bridge unit 46 has also become one.

The above described operation is repeated continuously in the case that an authentication request or a decrement authentication request is received from another apparatus connected to IEEE 1394 bus #2 (2) under the condition of authenticated (S2).

In the case that an apparatus connected to IEEE 1394 bus #2 (2) stops receiving, decoding and displaying AV data, this is declared to the bridge unit 46 in the same manner as in the second embodiment and the bridge unit 46 carries out decrement authentication and, thereby, the apparatuses connected to IEEE 1394 bus #1 (1) and to IEEE 1394 bus #2 (2) can newly utilize AV data in the same manner as in the second embodiment even in the case that IEEE 1394 bus #1 (1) and IEEE 1394 bus #2 (2) are connected to the bridge unit.

Furthermore, the source 3 must immediately send an isochronous packet when a band and a channel are allocated from the isochronous resource manager according to IEEE 1394. The source 3 sends an empty isochronous packet to IEEE 1394 bus #1 (1) in the case wherein no AV data is to be transmitted. Then, even in the case that the source 3 does not send an empty isochronous packet to IEEE 1394 bus #1 (1), authentication of the source 3 is reset in the DTCP system.

Accordingly, in the case that the bridge unit 46 is in the authenticated condition (S2) and the transmission of isochronous packets from the source 3 is cut off, a transition from the authenticated condition (S2) is made, the key counter is initialized to zero and the authentication number counting means 48 of the bridge unit 46 initializes the counted authentication number to zero so as to return the authenticated condition (S2). That is to say, when the authentication of source 3 is reset, the bridge unit 46 also resets the authentication.

In addition, though the transmission of isochronous packets from the source 3 continues, in the case that the transmission of isochronous packets from the bridge unit 46 is cut off, a transition is made from the authenticated condition (S2) and the authentication number counted by the authentication number counting means 48 of the bridge unit 46 is initialized to zero and the condition again returns to the authenticated condition (S2). That is to say, the bridge unit 46 resets the authentication.

In addition, in the case that the bridge unit 46 that is in the authenticated condition (S2) discovers that an apparatus, such as the sink 5 (9) connected to IEEE 1394 bus #2 (2), has been lost from IEEE 1394 bus #2 (2), the authenticated condition (S2) makes a transition to the condition wherein decrement authentication (S6) is carried out on the source.

Then, under the condition wherein decrement authentication (S6) is carried out on the source, the bridge unit 46 carries out decrement authentication for the source 3. In the case that this is successful, the key count number is decreased by one so that the condition makes a transition to the authenticated condition (S2) In the case of failure, the key count number is not decreased so that the condition makes a transition to the authenticated condition (S2).

Thus, even in the case that the bridge unit 46 connects IEEE 1394 bus #1 (1) and IEEE 1394 bus #2 (2), the same effects can be gained as are described in the second embodiment.

Here, though in the present embodiment in the case that the bridge unit 46 receives an authentication request from an apparatus connected to IEEE 1394 bus #2 (2), it is determined whether authentication is carried out on that apparatus or authentication is carried out on the source 3 before authentication is carried out on that apparatus based on the relative magnitude between the key count number counted by the key counting means 47 and the authentication number counted by the authentication number counting means 48 of the bridge unit 46, the invention is not limited to this. In the case that the key counting means 47 is not provided and an authentication request is received from the sink connected to IEEE 1394 bus #2 (2), only when authentication is carried out on the source 3 before this authentication is carried and the authentication is successfully carried out on the source 3, the authentication can be carried out on the sink. The same effects as of the present embodiment can be gained in such a manner.

Sixth Embodiment

Next, the sixth embodiment is described.

A copyright protection system of the present embodiment is shown in FIG. 1 in the same manner as in the fifth embodiment.

FIG. 5 shows a source 3 of the present embodiment as an STB 40. The STB 40 is the same as described in the second embodiment.

In addition, FIG. 3 shows a sink 1 (5) connected to IEEE 1394 bus #1 (1), a sink 5 (9) connected to IEEE 1394 bus #2 (2), and the like, as a TV 30. The TV 30 is the same as described in the second embodiment.

In addition, FIG. 10 shows a bridge unit 46 as a sink 2 (bridge unit) (6).

The bridge unit 46 of the present embodiment has the same configuration as that of the fifth embodiment.

Next, the operation of the present embodiment having such a configuration is described focusing on the difference from that of the fifth embodiment.

In the fifth embodiment, the bridge unit 46 carries out authentication only once on the source 3 at the time when the unauthenticated condition (S0) makes a transition to the condition wherein authentication (S1) is carried out on the source or to the authenticated condition (S2) in the state machine diagram of FIG. 11 and, in the case of success, the key count number counted by the key counting means 47 is set at 1.

In contrast to this, in the present embodiment the authentication request means 33 of the bridge unit 46 transmits an authentication command, to which is added the number of authentications desired to be carried out on the source 3, to the source 3 at the time when the unauthenticated (S0) condition makes a transition to the condition wherein the authentication (S1) is carried out on the source or to the authenticated (S2) condition.

Then, the authentication means 34 on the reception side of the bridge unit 46 carries out authentication for the source 3 according to the number of times designated at the time authentication is requested. On the other hand, the source 3 carries out authentication by determining whether authentication from the bridge unit 46 is rejected or authentication is carried out based on the upper limit number stored in the upper limit authentication number storage means 25 in the same manner as in the second embodiment and on the authentication number counted by the authentication number counting means 24 of STB 40 at the time when authentication is carried out on the authentication means 34 on the reception side of the bridge unit 46.

The key counting means 47 increases the key count number by the number of times that the bridge unit 46 has successfully carried out authentication when authentication is collectively carried out according to the number of times designated in such a manner.

Accordingly, in the case that the above described authentication is successful and in the case that the number of times that is desired that the authentication request means 33 carry out authentication for the source 3 attached to the authentication command is greater than 1 at the point in time when a transition is made to the authenticated (S2) condition, the key count number has a value greater than 1 and the authentication number of the authentication number counting means 48 of the bridge unit 46 has become 0.

The parts other than the above are the same as in the fifth embodiment. That is to say, the bridge unit 46 of the present embodiment makes a notification of the number of times authentication is desired to be carried out to the source 3 and authentication is carried out in advance according to this number of times and, therefore, even in the case that an authentication request is received from an apparatus such as the sink 5 (9) connected to IEEE 1394 bus #2 (2), it is not necessary to carry out a two-stage process wherein the authentication request is once rejected and authentication is successfully carried out on the source 3 and, again, authentication is carried out on this apparatus that has received the authentication request. An authentication request from an apparatus, such as sink 5, connected to IEEE 1394 bus #2 (2) is instantly accepted up to the number of times authentication is carried out on the source 3 in advance so that authentication can be carried out on this apparatus. Accordingly, in addition to the same effects as in the fifth embodiment, the effects can further be gained wherein response time of the bridge unit 46 to the authentication request is shortened.

Seventh Embodiment

Next, the seventh embodiment is described.

A copyright protection system of the present embodiment is shown in FIG. 1 in the same manner as in the fifth embodiment.

A source 3 of the present embodiment is shown in FIG. 5 as an STB 40. The STB 40 is the same as is described in the second embodiment.

In addition, FIG. 3 shows a sink 1 (5) connected to IEEE 1394 bus #1 (1) of the present embodiment, a sink 5 (9) connected to IEEE 1394 bus #2 (2), and the like, as shown as a TV 30. The TV 30 is the same as is described in the second embodiment.

In addition, FIG. 10 shows a bridge unit 46 as a sink 2 (bridge unit) (6).

The bridge unit 46 of the present embodiment has the same configuration as that of the fifth embodiment.

Next, the operation of the present embodiment having such a configuration is described focusing on the differences from the fifth embodiment.

In the fifth embodiment, in the case that decrement authentication is requested from an apparatus connected to IEEE 1394 bus #2 (2), the authenticated (S2) condition makes a transition to the condition wherein decrement authentication (S5) is carried out on the sink or on another bridge (reception side) and, furthermore, makes a transition to the condition wherein decrement authentication (S6) is carried out on the source and, again, makes a transition to the authenticated (S2) condition.

That is to say, the bridge unit 46 decreases the authentication number counted by the authentication number counting means 48 of the bridge unit 46 by 1 in the case that decrement authentication is successfully carried out on an apparatus connected to IEEE 1394 bus #2 (2) and, subsequently, decreases the key count number counted by the key counting means 47 by 1 in the case that decrement authentication is successfully carried out on the source 3.

In contrast to this, in the present embodiment the authenticated (S2) condition makes a transition to the condition wherein decrement authentication (S5) carried out on the sink or on another bridge (reception side) in the case that decrement authentication is requested from IEEE 1394 bus #2 (2). That is to say, the bridge unit 46 carries out decrement authentication for the apparatus connected to IEEE 1394 bus #2 (2) and in the case of a successful result, the authentication number counted by the authentication number counting means 48 of the bridge unit 46 is decreased by 1.

Next, a transition is not made to the condition wherein decrement authentication (S6) carried out on the source but, rather, a transition is made to the authenticated (S2) condition. That is to say, decrement authentication is not sequentially carried out on the source 3. Accordingly the key count number counted by the key counting means 47 does not change.

When a predetermined period of time, for example 5 minutes, has elapsed wherein an authentication request is not newly received from the apparatus connected to IEEE 1394 bus #2 since the above described decrement authentication is carried out, the bridge unit 46 carries out decrement authentication for the source.

In the case that an authentication request is received from an apparatus, such as sink 7 (11), connected to IEEE 1394 bus #2 (2) under the condition wherein the bridge unit 46 has not yet carried out decrement authentication for the source, the authentication number has a value smaller than that of the key count number and, therefore, the bridge unit 46 does not need to carry out authentication for the source 3 before authentication is carried out on the apparatus that has requested that authentication so that the bridge unit 46 can respond quickly, in comparison with the fifth embodiment, to the authentication request from IEEE 1394 bus #2 (2).

Accordingly, in addition to the same effects as of the fifth embodiment, the effect can further be gained that the response time to the authentication request of the bridge unit 46 becomes shorter.

Here, the present invention is a program for allowing a computer to implement the functions of a means (or unit, element, circuit, portion, or the like) of the entirety, or a portion of, the above described copyright protection system of the present invention and is a program that operates in cooperation with a computer.

The present invention is a medium that holds a program for allowing a computer to implement the entirety of, or a portion of, the functions of a means of the entirety of, or a portion of, the above described copyright protection system of the present invention and is a medium that can be read by a computer and wherein the above described read out program implements the above described functions in cooperation with the above described computer.

Here, a portion of a means (or unit, element, circuit, portion, or the like) of the present invention and a portion of the step (or process, operation, working effect, or the like) of the present invention mean several means or steps within this plurality of means or steps, or mean a portion of the functions or a portion of the operation within one means and one step.

In addition, a portion of a unit (or element, circuit, portion, or the like) of the present invention means several units within this plurality of units, means a portion of a means (or element, circuit, portion, or the like) within one unit or means a portion of the functions within one means.

In addition, a recording medium that records a program of the present invention and that can be read by a computer is also included in the present invention.

In addition, one application mode of a program of the present invention may be a mode wherein the program is recorded in a recording medium that can be read by a computer so as to operate in cooperation with the computer.

In addition, one application mode of a program of the present invention may be a mode wherein the program is transmitted through a transmission medium and is read by a computer so as to operate in cooperation with the computer.

In addition, the data structure of the present invention includes a data base, a data format, a data table, a data list, a type of data and the like.

In addition, the recording medium includes a ROM, and the like, while the transmission medium includes a transmission medium such as the Internet, light, radio waves, sound waves, and the like.

In addition, the above described computer of the present invention is not limited to pure hardware, such as a CPU, but may include firmware, an OS or, in addition, a peripheral apparatus.

Here, as described above, the configuration of the present invention may be implemented in a software manner or may be implemented in a hardware manner.

Industrial Applicability

As is clear from the above description, the present invention can provide a copyright protection system, a transmission unit, a reception unit, a bridge unit, a copyright protection method, a medium and a program wherein the desire of copyright holders for limitation on the number of reception apparatuses that can receive a signal requiring copyright protection can be met even in the case that a bridge unit is connected to a network.

In addition, the present invention can provide a copyright protection system, a transmission unit, a reception unit, a bridge unit, a copyright protection method, a medium and a program wherein the desire of copyright holders for limitation on the number of reception apparatuses that can receive a signal requiring copyright protection can be limited by designating the number of the reception apparatuses.

What is claimed is:

1. A copyright protection system for controlling a distribution of data according to a predetermined number of permitted distributions of the data, the data requiring copyright protection, the copyright protection system comprising:

at least one reception unit connected to a network and that transmits a request to receive the data, the at least one reception unit including an authentication receptor for transmitting an authentication request for carrying out an authentication; and a transmission unit for receiving the request to receive the data and for transmitting the data via the network to be used by the at least one reception unit based on the number of permitted distributions and a successful authentication between the transmission unit and the at least one reception unit, the transmission unit including an authentication processor for receiving the authentication request and for carrying out the authentication with the at least one reception unit, and an authentication number counter for counting and storing a number of successful authentications, wherein the transmission unit determines that the authentication is successful if the stored number of successful authentications is less than the predetermined number of distributions, and the authentication number counter decrements the stored number of successful authentications after determining that the at least one reception unit no longer uses the data;

wherein the authentication number counter increments the stored number of successful authentications after determining that the authentication processor successfully carries out the authentication;

wherein the copyright protection system further comprises a bridge unit connecting the network to another network;

wherein the bridge unit is handled in a same manner as the transmission unit in the other network;

if the authentication request is carried out by the at least one reception unit connected to the other network, authentication is carried out for the transmission unit connected to the network before authentication is carried out for the at least one reception unit and, if the authentication for the transmission unit is successful, authentication is carried out for the at least one reception unit; and wherein the bridge unit has a key counter for counting a limitation number of a permissions allocated by the transmission unit that is connected to the network, the authentication number counter of the bridge unit counts the number of successful authentications carried out for the at least one reception unit, which is connected to the other network, by the authentication processor on a transmission side of the bridge unit, the bridge unit sets the number of successful authentications carried out for the transmission unit, which is connected to the network, as the limitation number of the permissions counted by the key counter, in a case that a decrement authentication request is carried out, in order to decrement the number counted by the authentication number counter of the bridge unit, by the at least one reception unit that is connected to the other network, the bridge unit does not carry out decrement authentication for the transmission unit that is connected to the network but, rather, carries out decrement authentication for the at least one reception unit, the authentication number counting means of the bridge unit decrements the number of successful authentications when the decrement authentication is successful, and at a time when the authentication request is newly carried out by the at least one reception unit connected to the other network, authentication is carried out for the at least one reception unit if the limitation number of the permissions is smaller than the number of successful authentications that is counted by the authentication number counter of the bridge unit while authentication is carried out for the transmission unit connected to the network before authentication is carried out for the at least one reception unit if the limitation number of the permissions is not smaller than the number of successful authentications counted by the authentication number counter of the bridge unit and, then, authentication is carried out for the at least one reception unit if the authentication for the transmission unit is successful.

2. The copyright protection system according to claim 1, wherein after the authentication is successfully carried out for the transmission unit, the at least one reception unit does not, again, transmit a further authentication request as long as the successful authentication is not reset due to a predetermined cause.

3. The copyright protection system according to claim 2, further comprising a bridge unit connecting the network to another network, wherein the bridge unit is handled in a same manner as the at least one reception unit in the network to which the transmission unit is connected, and wherein the bridge unit is configured to carry out the authentication request.

4. The copyright protection system according to claim 1, wherein after the authentication is successfully carried out for the at least one reception unit, the transmission unit does not accept a further authentication request from the at least one reception unit as long as the successful authentication is not reset due to a predetermined cause.

5. The copyright protection system according to claim 4, further comprising a bridge unit connecting the network to another network, wherein the bridge unit is handled in a same manner as the at least one reception unit in the network to which the transmission unit is connected, and wherein if an authentication request is carried out by the bridge unit, the transmission unit accepts the authentication request from the bridge unit.

6. The copyright protection system according to claim 1, wherein if the authentication is successfully carried out on the at least one reception unit, the transmission unit does not carry out further authentication, again, for the at least one reception unit and the authentication number counter does not increment the number of successful authentications even if the further authentication is successful, as long as the successful authentication is not reset due to a predetermined cause.

7. The copyright protection system according to claim 6, further comprising a bridge unit connecting the network to another network,
   wherein the bridge unit is handled in a same manner as the at least one reception unit in the network to which the transmission unit is connected, and
   wherein if authentication is successfully carried out again for the bridge unit, the authentication number counter increments the number of successful authentications.

8. The copyright protection system according to any of claims 2 to 7, wherein the authentication processor has:
   a registration unit configured to register information that specifies the at least one reception unit for which the authentication is successful; and
   a redundancy determination unit configured to determine whether a new authentication request for the at least one reception unit is the authentication request from the at least one reception unit that has already been successful, when the new authentication request is carried out by the at least one reception unit, by utilizing the registered information that specifies the at least one reception unit.

9. The copyright protection system according to any of claims 2 to 7, wherein a reset of the authentication occurs at a time when an update of a key is carried out.

10. The copyright protection system according to any of claims 2 to 7, wherein a reset of the authentication occurs at a time when an update of an exchange key is carried out.

11. The copyright protection system according to claim 9, comprising a bridge unit connecting the network to another network,
   wherein the bridge unit is handled in a same manner as the at least one reception unit in the network to which the transmission unit is connected, and
   wherein if the transmission unit carries out the update of the key, the reset of the authentication is carried out also in the other network.

12. The copyright protection system according to any of claims 2 to 7, wherein a reset of the authentication occurs at a time when a bus reset is carried out.

13. The copyright protection system according to claim 12, comprising a bridge unit connecting the network to another network,
   wherein the bridge unit is handled in a same manner as the at least one reception unit in the network to which the transmission unit is connected, and
   wherein if the bus reset is carried out in the network to which the transmission unit is connected, the reset of the authentication is carried out also in the other network.

14. The copyright protection system according to claim 1, wherein the predetermined number of permitted distributions indicates that the authentication processor does not accept another authentication request from the at least one reception unit if incrementing the number of successful authentications causes the number of successful authentications to become equal to or greater than the predetermined number of permitted distributions.

15. The copyright protection system according to claim 1, comprising a bridge unit connecting the network to another network comprising a plurality of reception units,
   wherein the bridge unit is handled in a same manner as the at least one reception unit in the network to which the transmission unit is connected, and
   wherein a stopping of use of the data by the bridge unit indicates that all of the plurality of reception units connected to other network no longer use the data requiring copyright protection that is sent from the transmission unit.

16. The copyright protection system according to claim 1, wherein the transmission unit has a registration unit configured to conduct registration of information that specifies that the at least one reception unit that has successfully carried out the authentication for the authentication processor, and
   the registration unit cancels the registration of the information that specifies the at least one reception unit that has successfully carried out the authentication for the authentication processor if the authentication number counter decrements the number of successful authentications.

17. The copyright protection system according to claim 1, wherein the transmission unit has an examination unit configured to conduct an examination of whether the at least one reception unit has stopped using the data requiring copyright protection.

18. The copyright protection system according to claim 17, wherein a stoppage of utilization of the data requiring copyright protection indicates that the at least one reception unit is detached from the network, and
   the examination unit periodically examines whether the at least one reception unit is detached from the network.

19. The copyright protection system according to claim 18, wherein the examination indicates a periodic examination of a connection number that is a number of the at least one reception unit connected to the network and a checking of which of the at least one reception unit is detached from the network after the connection number is decremented.

20. The copyright protection system according to claim 17, wherein the examination unit checks if the at least one reception unit has stopped using the data requiring copyright protection by examining an operational condition of the at least one reception unit or an active condition of connection plugs, and
   the authentication number counter decrements the number of successful authentications if, as a result of the examination by the examination unit, the at least one reception unit is determined not to utilize the data requiring copyright protection.

21. The copyright protection system according to claim 18 or 19, wherein the examination unit has a correspondence table of allowing information that specifies the at least one reception unit to correspond to a signature of that at least one reception unit,
   the examination unit determines whether the authentication has been carried out on the at least one reception unit that is detached from the network by utilizing the correspondence table, and
   the authentication number counter decrements the number of successful authentications if a result of the determination shows that the authentication has been successfully carried out for the at least reception unit that is detached from the network.

22. The copyright protection system according to claim 1, wherein the authentication receptor carries out a request for a decrement authentication for decrementing the number of successful authentications for the transmission unit if the at least one reception unit stops using the data requiring copyright protection that is sent from the transmission unit,
   the authentication processor carries out the decrement authentication for the authentication receptor, and the authentication number counter decrements the number of successful authentications if the decrement authentication is successful.

23. The copyright protection system according to claim 22, wherein a command for decrement authentication, that is a command for carrying out the decrement authentication, is prepared separately from the authentication request that is the request for carrying out the authentication at a time when the data requiring copyright protection is utilized.

24. The copyright protection system according to claim 22 or 23, wherein the data requiring copyright protection is encrypted and
the at least one reception unit abandons a key for decoding the data requiring copyright protection if the decrement authentication is successful.

25. The copyright protection system according to claim 22 or 23, wherein the decrement authentication differs from the authentication for utilizing the data requiring copyright protection in at least one of a signature, an authentication method and an operational equation.

26. The copyright protection system according to claim 16, wherein if the successful authentication is reset due to a predetermined cause, the authentication number counter initializes the number of successful authentications while the registration unit cancels all the registrations of information that specifies the at least one reception unit which has successfully carried out the authentication for the authentication processor.

27. The copyright protection system according to claim 1, wherein, if the authentication number counter of the bridge unit is subtracted, the bridge unit carries out decrement authentication for the transmission unit connected to the network, in order to decrement the number of successful authentications counted by the authentication number counter of the transmission unit that is connected to the network.

28. The copyright protection system according to claim 1, wherein the authentication number counter of the bridge unit counts the number of the successful authentications carried out for the at least one reception unit, which is connected to the other network, by the authentication processor on a transmission side of the bridge unit.

29. The copyright protection system according to claim 28, wherein, if the transmission unit is newly connected to the network, the bridge unit carries out authentication for the newly connected transmission unit in accordance with the number that is counted by the authentication number counter of the bridge unit.

30. The copyright protection system according to claim 1, wherein the bridge unit reencrypts data that is sent from the transmission unit connected to the network and transmits the reencrypted data to the at least one reception unit connected to the other network,
the authentication number counter of the bridge unit counts the number that of successful authentications carried out for the at least one reception unit, which is connected to the other network, by the authentication processor on the transmission side of the bridge unit, and
the bridge unit has a key counter for counting a limitation number of permissions allocated by the transmission unit connected to the network.

31. The copyright protection system according to claim 30, wherein in a case that an authentication request is carried out by the at least one reception unit that is connected to the other network, if the limitation number of the permissions counted by the key counter is greater than the number of successful authentications counted by the authentication number counter of the bridge unit, the bridge unit permits the authentication request.

32. The copyright protection system according to claim 31, wherein an upper limit of the limitation number of permissions counted by the key counter is in advance given by the transmission unit that is connected to the network.

33. The copyright protection system according to claim 31, wherein the bridge unit carries out authentication for the transmission unit, which is connected to the network and, thereby, an upper limit of the limitation number of permissions counted by the key counter is added.

34. The copyright protection system according to claim 30, wherein, in a case that an authentication request is carried out by the at least one reception unit connected to the other network, if the limitation number of the permissions counted by the key counter is not greater than the number of successful authentications counted by the authentication number counter of the bridge unit, the bridge unit rejects the authentication request.

35. The copyright protection system according to claim 30, wherein, in a case that an authentication request is carried out by the at least one reception unit connected to the other network, if the limitation number of the permissions counted by the key counter is not greater than the number of successful authentications counted by the authentication number counter of the bridge unit, the bridge unit calls on the transmission unit connected to the network to add the limitation number of the permissions.

36. The copyright protection system according to claim 30, wherein, in a case that an authentication request is carried out by the at least one reception unit connected to the other network, if the limitation number of the permissions counted by the key counter is not greater than the number of successful authentications counted by the authentication number counter of the bridge unit, the bridge unit carries out an authentication request for the transmission unit connected to the network and the key counter adds the limitation number of the permissions in the case that the authentication is successful.

37. The copyright protection system according to claim 1, wherein the bridge unit makes a notification of a number of the at least one reception unit that is connected to the other network and that carries out an authentication request for the transmission unit connected to the network whenever an authentication request is carried out by the at least one reception unit connected to the other network.

38. The copyright protection system according to claim 37, wherein a field for making a notification of the number of the at least one reception unit is provided in an authentication command of the bridge unit to carry out an authentication request for the transmission unit that is connected to the network so that the bridge unit makes a notification of the number of the at least one reception unit by utilizing the field.

39. The copyright protection system according to claim 1, wherein an authentication command of the bridge unit to carry out an authentication request for the transmission unit that is connected to the network is distinguished from an authentication command of the at least one reception unit that does not have a function of the bridge unit and that is connected to the network to carry out an authentication request for the transmission unit connected to the network.

40. The copyright protection system according to claim 39, wherein the distinguishment is carried out by means of a signature attached to the authentication command.

41. A transmission unit for transmitting data requiring copyright protection, by utilizing a network, to at least one reception unit which (1) has an authentication receptor for transmitting an authentication request for carrying out an authentication, (2) is connected to the network, and (3) receives and utilizes the data requiring copyright protection, wherein the transmission unit comprises:
　　an authentication processor for receiving the authentication request and for carrying out the authentication with the at least one reception unit; and
　　an authentication number counter for counting and storing a number of successful authentications,
　　wherein the transmission unit determines that the authentication is successful if the stored number of successful authentications is less than a predetermined number of permitted distributions,
　　if the authentication is successful, the transmission unit transmits the data via the network to the reception unit for use by the reception unit, and
　　the authentication number counter decrements the stored number of successful authentications after determining that the at least one reception unit no longer uses the data;
　　wherein the authentication number counter increments the stored number of successful authentications after determining that the authentication processor successfully carries out the authentication;
　　wherein a copyright protection system further comprises a bridge unit connecting the network to another network;
　　wherein the bridge unit is handled in a same manner as the transmission unit in the other network, and
　　if the authentication request is carried out by the at least one reception unit connected to the other network,
　　authentication is carried out for the transmission unit connected to the network before authentication is carried out for the at least one reception unit and, if the authentication for the transmission unit is successful, authentication is carried out for the at least one reception unit; and
　　wherein the bridge unit has a key counter for counting a limitation number of a permissions allocated by the transmission unit that is connected to the network,
　　the authentication number counter of the bridge unit counts the number of successful authentications carried out for the at least one reception unit, which is connected to the other network, by the authentication processor on a transmission side of the bridge unit,
　　the bridge unit sets the number of successful authentications carried out for the transmission unit, which is connected to the network, as the limitation number of the permissions counted by the key counter,
　　in a case that a decrement authentication request is carried out, in order to decrement the number counted by the authentication number counter of the bridge unit, by the at least one reception unit that is connected to the other network, the bridge unit does not carry out decrement authentication for the transmission unit that is connected to the network but, rather, carries out decrement authentication for the at least one reception unit,
　　the authentication number counting means of the bridge unit decrements the number of successful authentications when the decrement authentication is successful, and
　　at a time when the authentication request is newly carried out by the at least one reception unit connected to the other network,
　　authentication is carried out for the at least one reception unit if the limitation number of the permissions is smaller than the number of successful authentications that is counted by the authentication number counter of the bridge unit while authentication is carried out for the transmission unit connected to the network before authentication is carried out for the at least one reception unit if the limitation number of the permissions is not smaller than the number of successful authentications counted by the authentication number counter of the bridge unit and, then, authentication is carried out for the at least one reception_unit if the authentication for the transmission unit is successful.

42. A reception unit that is connected to a network and that is utilized for receiving and using data requiring copyright protection, wherein the reception unit comprises:
　　an authentication receptor for transmitting an authentication request for carrying out an authentication with a transmission unit having (i) an authentication processor for receiving the authentication request and for carrying out the authentication with the reception unit and (ii) an authentication number counter for counting and storing a number of successful authentications,
　　wherein the transmission unit determines that the authentication is successful if the stored number of successful authentications is less than a predetermined number of permitted distributions,
　　if the authentication is successful, the transmission unit transmits the data requiring copyright protection to the reception unit for use by the reception unit, and
　　the authentication number counter decrements the stored number of successful authentications if the reception unit no longer uses the data;
　　wherein the authentication number counter increments the stored number of successful authentications after determining that the authentication processor successfully carries out the authentication;
　　wherein a copyright protection system further comprises a bridge unit connecting the network to another network;
　　wherein the bridge unit is handled in a same manner as the transmission unit in the other network, and
　　if the authentication request is carried out by the at least one reception unit connected to the other network,
　　authentication is carried out for the transmission unit connected to the network before authentication is carried out for the at least one reception unit and, if the authentication for the transmission unit is successful, authentication is carried out for the at least one reception unit; and
　　wherein the bridge unit has a key counter for counting a limitation number of a permissions allocated by the transmission unit that is connected to the network,
　　the authentication number counter of the bridge unit counts the number of successful authentications carried out for the at least one reception unit, which is connected to the other network, by the authentication processor on a transmission side of the bridge unit,
　　the bridge unit sets the number of successful authentications carried out for the transmission unit, which is connected to the network, as the limitation number of the permissions counted by the key counter,
　　in a case that a decrement authentication request is carried out, in order to decrement the number counted by the authentication number counter of the bridge unit, by the at least one reception unit that is connected to the other network, the bridge unit does not carry out decrement authentication for the transmission unit that is connected to the network but, rather, carries out decrement authentication for the at least one reception unit, the authentication number counting means of the bridge unit decrements the number of successful authentications when the decrement authentication is successful, and at a time when the authentication request is newly carried out by the at least one reception unit connected to the other network, authentication is carried out for the at least one reception unit if the limitation number of the permissions is smaller than the number of successful authentications that is counted by the authentication number counter of the bridge unit while authentication is carried out for the transmission unit connected to the network before authentication is carried out for the at least one reception unit if the limitation number of the permissions is not smaller than the number of successful authentications counted by the authentication number counter of the bridge unit and, then, authentication is carried out for the at least one reception unit if the authentication for the transmission unit is successful.

43. A bridge unit for transmitting data requiring copyright protection that is transmitted from a transmission unit connected to one network to a reception unit connected to another network, the bridge unit being connect to the one network and to the other network, wherein the bridge unit comprises:

a authentication processor that carries out an authentication with the reception unit;

an authentication number counter for counting and storing a number of successful authentications carried out by the authentication processor; and an authentication receptor that carries out an authentication with the transmission unit, wherein the transmission unit has: an authentication processor for carrying out the authentication with the authentication receptor of the bridge unit; and an authentication number counter for counting and storing a number of successful authentications carried out by the authentication processor, the reception unit has an authentication receptor that carries out the authentication with the authentication processor of the bridge unit, the bridge unit determines that the authentication is successful if the stored number of successful authentications is less than a predetermined number of permitted distributions, the transmission unit determines that the authentication is successful if the stored number of successful authentications is less than a predetermined number of permitted distributions, if the authentication is successful, the transmission unit transmits the data requiring copyright protection to the bridge unit, if the authentication successful, the bridge unit transmits the data requiring copyright protection to the reception unit, the authentication number counter decrements the stored number of successful authentications if the bridge unit no longer uses the data, and the authentication number counter decrements the stored number of successful authentications if the reception unit no longer uses the data;

wherein the authentication number counter increments the stored number of successful authentications after determining that the authentication processor successfully carries out the authentication;

wherein the bridge unit is handled in a same manner as the transmission unit in the other network, and if the authentication request is carried out by the at least one reception unit connected to the other network, authentication is carried out for the transmission unit connected to the network before authentication is carried out for the at least one reception unit and, if the authentication for the transmission unit is successful, authentication is carried out for the at least one reception unit; and wherein the bridge unit has a key counter for counting a limitation number of a permissions allocated by the transmission unit that is connected to the network, the authentication number counter of the bridge unit counts the number of successful authentications carried out for the at least one reception unit, which is connected to the other network, by the authentication processor on a transmission side of the bridge unit, the bridge unit sets the number of successful authentications carried out for the transmission unit, which is connected to the network, as the limitation number of the permissions counted by the key counter, in a case that a decrement authentication request is carried out, in order to decrement the number counted by the authentication number counter of the bridge unit, by the at least one reception unit that is connected to the other network, the bridge unit does not carry out decrement authentication for the transmission unit that is connected to the network but, rather, carries out decrement authentication for the at least one reception unit, the authentication number counting means of the bridge unit decrements the number of successful authentications when the decrement authentication is successful, and at a time when the authentication request is newly carried out by the at least one reception unit connected to the other network, authentication is carried out for the at least one reception unit if the limitation number of the permissions is smaller than the number of successful authentications that is counted by the authentication number counter of the bridge unit while authentication is carried out for the transmission unit connected to the network before authentication is carried out for the at least one reception unit if the limitation number of the permissions is not smaller than the number of successful authentications counted by the authentication number counter of the bridge unit and, then, authentication is carried out for the at least one reception unit if the authentication for the transmission unit is successful.

* * * * *